United States Patent
Tamura

(10) Patent No.: US 9,071,601 B2
(45) Date of Patent: Jun. 30, 2015

(54) AUTHORITY DELEGATE SYSTEM, SERVER SYSTEM IN AUTHORITY DELEGATE SYSTEM, AND CONTROL METHOD FOR CONTROLLING AUTHORITY DELEGATE SYSTEM

(71) Applicant: CANON KABUSHIKI KAISHA, Tokyo (JP)

(72) Inventor: Yu Tamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 13/727,437

(22) Filed: Dec. 26, 2012

(65) Prior Publication Data

US 2013/0185784 A1 Jul. 18, 2013

(30) Foreign Application Priority Data

Jan. 16, 2012 (JP) ................................ 2012-006204

(51) Int. Cl.
- *G06F 21/00* (2013.01)
- *H04L 29/06* (2006.01)
- *H04L 9/32* (2006.01)
- *G06F 21/10* (2013.01)

(52) U.S. Cl.
CPC ........... *H04L 63/0853* (2013.01); *H04L 9/3213* (2013.01); *G06F 21/10* (2013.01); *H04L 63/10* (2013.01); *H04L 63/0815* (2013.01)

(58) Field of Classification Search
CPC ....... H04L 63/10; H04L 9/3213; G06F 21/10; G06F 21/00
See application file for complete search history.

(56) References Cited

U.S. PATENT DOCUMENTS

| | | | |
|---|---|---|---|
| 2005/0081065 A1* | 4/2005 | Brickell et al. | 713/202 |
| 2009/0183250 A1* | 7/2009 | Harada | 726/9 |
| 2010/0281522 A1* | 11/2010 | Hatakeyama | 726/4 |

FOREIGN PATENT DOCUMENTS

JP 2009129214 A * 6/2009

* cited by examiner

*Primary Examiner* — Shewaye Gelagay
*Assistant Examiner* — Kendall Dolly
(74) *Attorney, Agent, or Firm* — Canon USA, Inc., IP Division

(57) ABSTRACT

An authority delegate system including a first server system to manage specific information, a second server system to provide a service, an authentication device, and a client operated by a first user who is authorized to use the service, includes a reception unit, a transmission unit, a management unit, a determination unit, and a provision unit. The reception unit receives an authorization token shared range for authorizing specific information usage. The transmission unit transmits to the client a setting screen for setting whether to permit users within the shared range to share the authorization token. The management unit manages the setting screen set shared range, and the authorization token issued by the authentication device. The provision unit provides, in response to determining that the second user is included in the shared range and confirmation that the authorization token is valid, the service to the second user using the specific information.

12 Claims, 28 Drawing Sheets

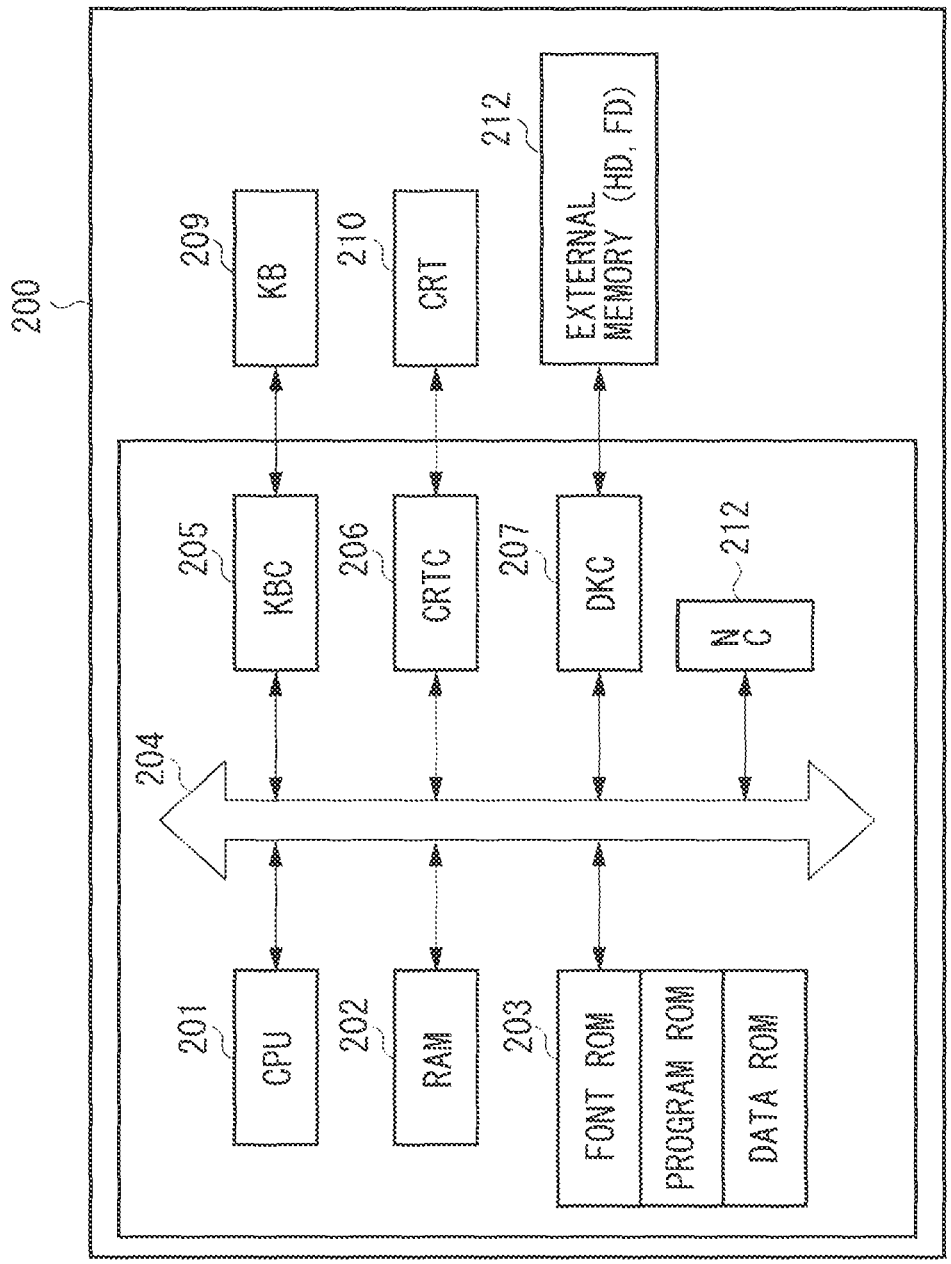

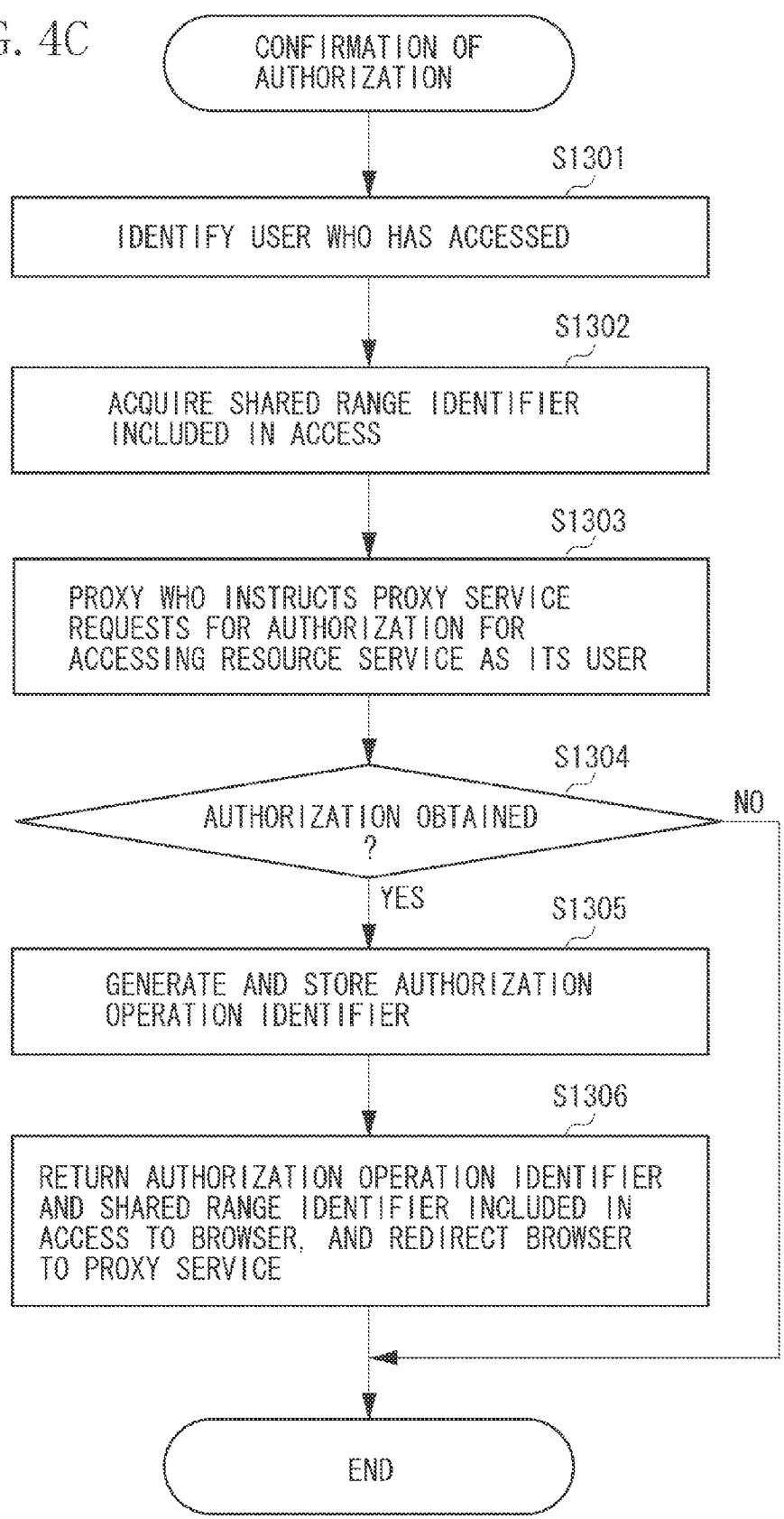

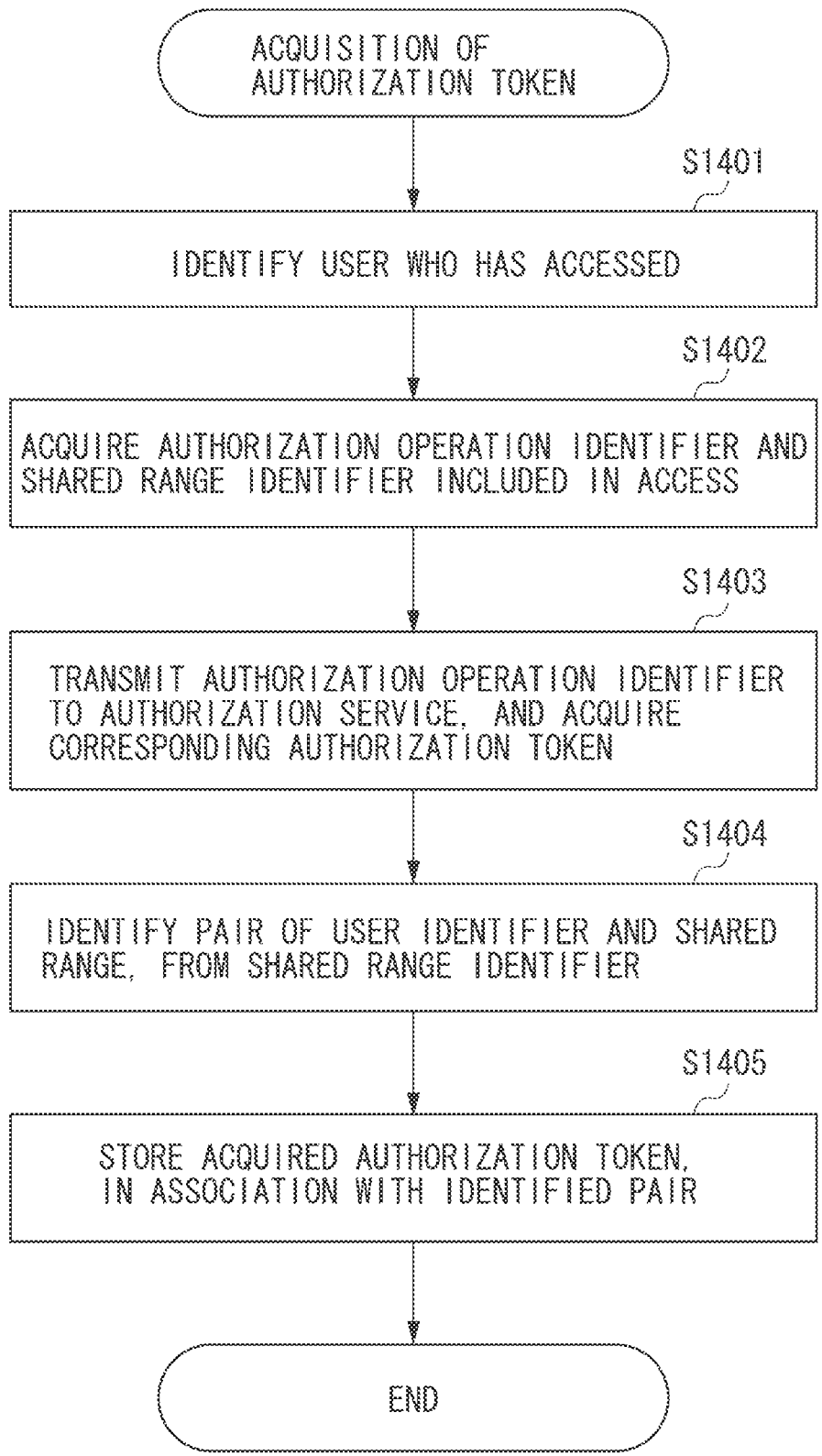

FIG. 8

| USER IDENTIFIER | AUTHORIZATION TOKEN SHARED RANGE | SHARED RANGE IDENTIFIER | AUTHORIZATION OPERATION IDENTIFIER | AUTHORIZATION TOKEN |
|---|---|---|---|---|
| USER K | PROXY X, PROXY Y | abc0001 | 111110-122334 | 987654321 |
| USER L | PROXY X, PROXY Z | abc0002 | 111110-233445 | 987656789 |
| USER M | PROXY X | abc0003 | 111110-344556 | 987898789 |

1011

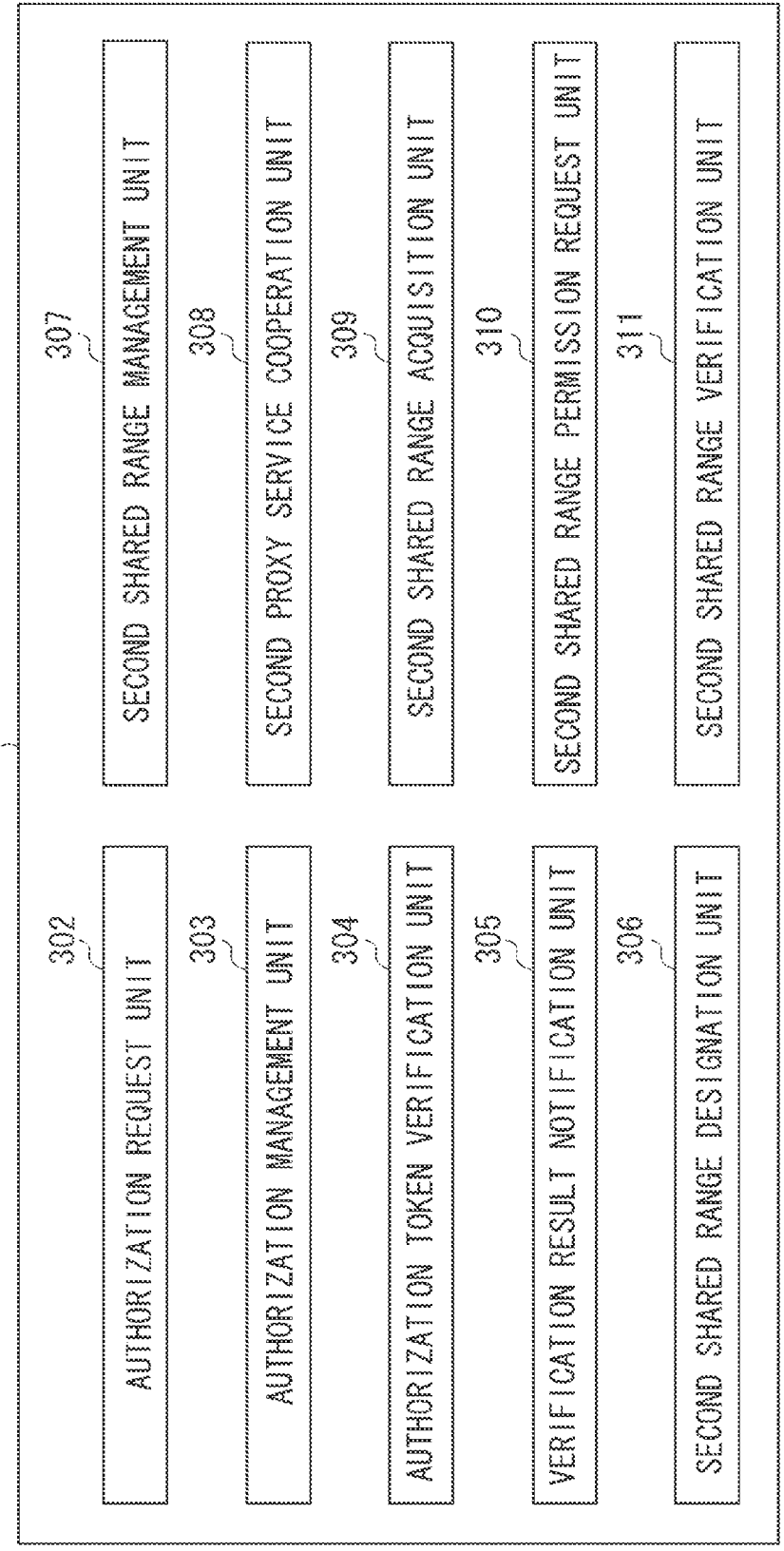

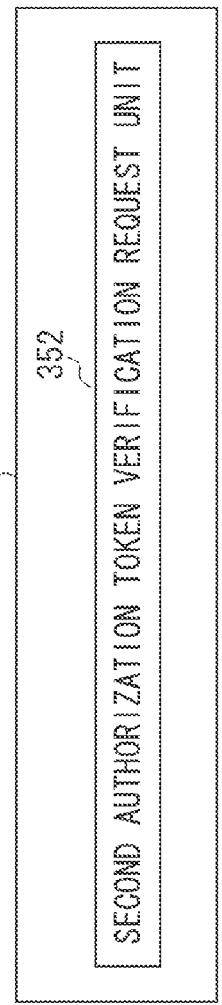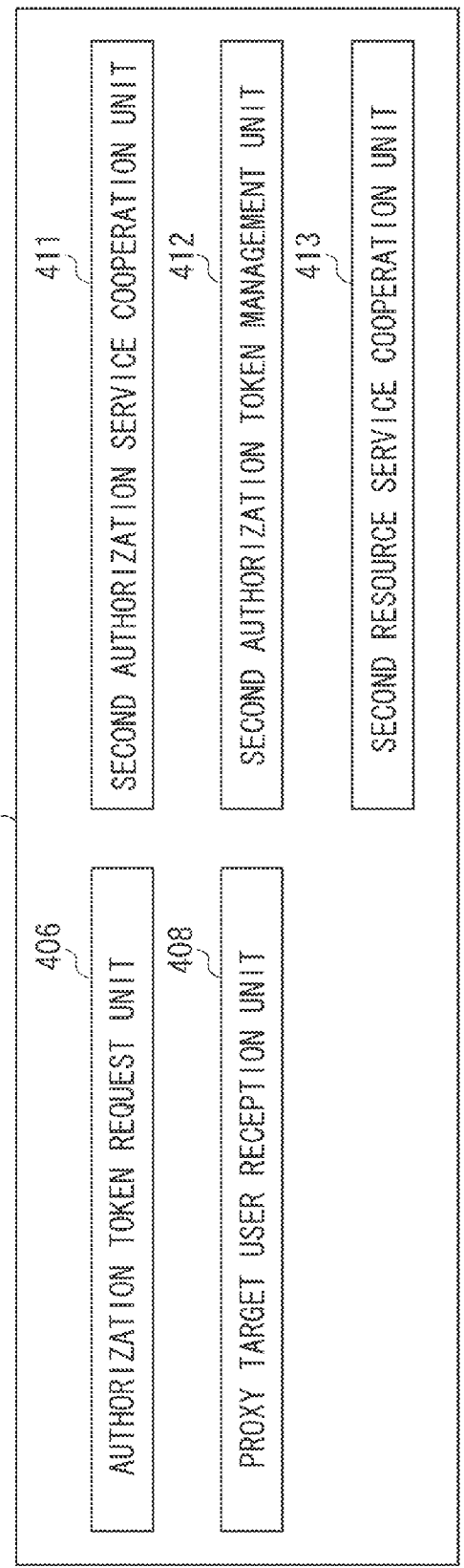

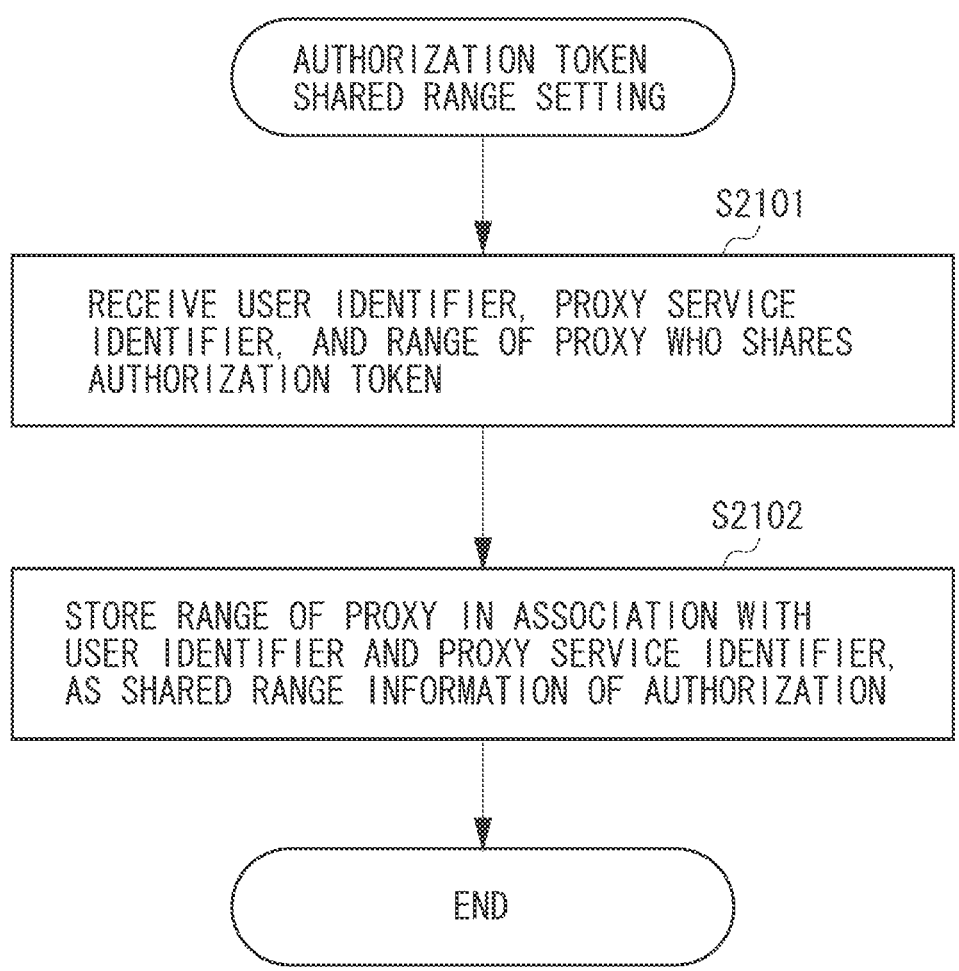

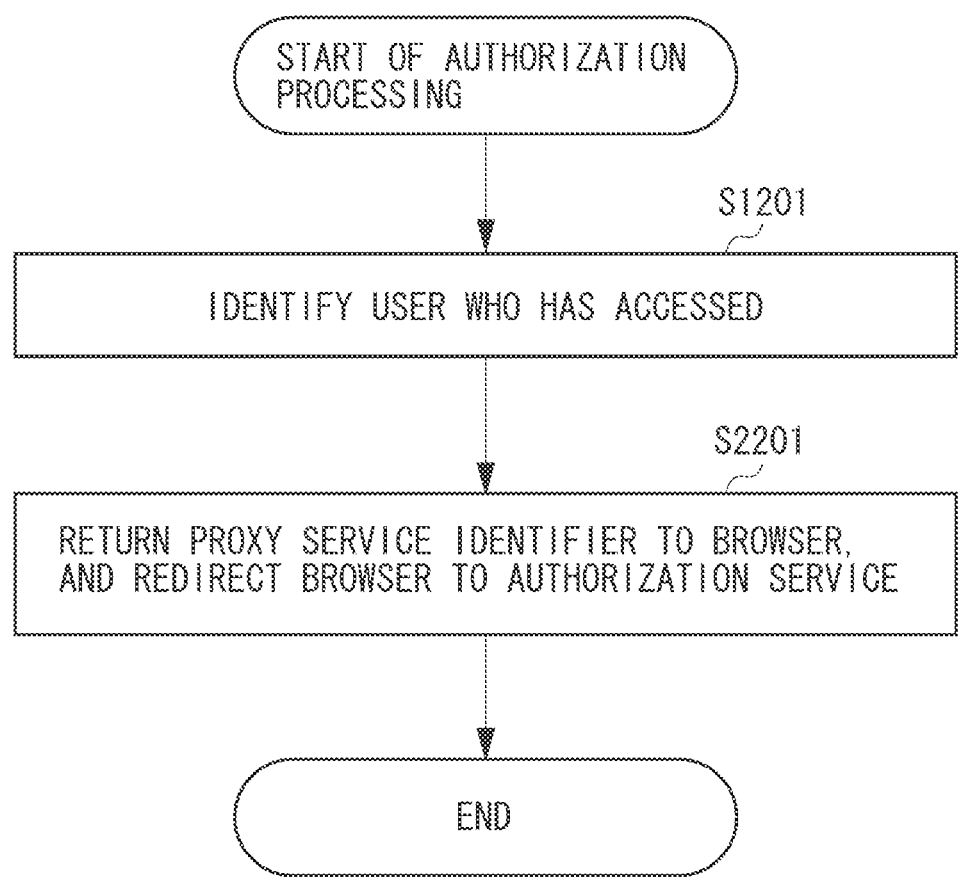

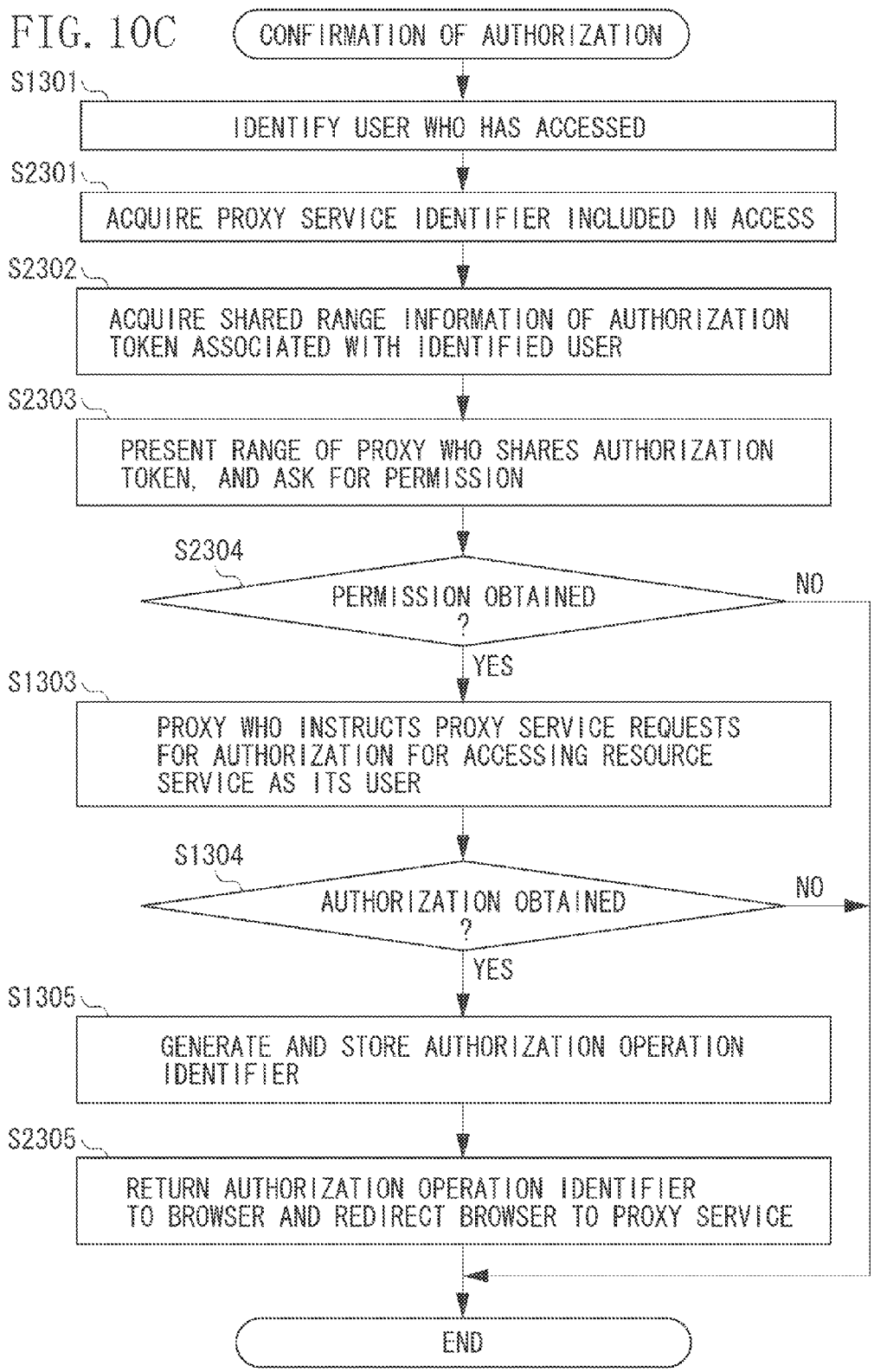

FIG. 12A

| USER IDENTIFIER | AUTHORIZATION TOKEN SHARED RANGE | PROXY SERVICE IDENTIFIER |
|---|---|---|
| USER K | PROXY X, PROXY Y | EXTERNAL SERVICE B |
| USER L | PROXY X, PROXY Z | EXTERNAL SERVICE B |
| USER M | PROXY X | EXTERNAL SERVICE B |

FIG. 12B

| USER IDENTIFIER | AUTHORIZATION OPERATION IDENTIFIER | AUTHORIZATION TOKEN |
|---|---|---|
| USER K | 111110-122334 | 987654321 |
| USER L | 111110-233445 | 987656789 |
| USER M | 111110-344556 | 987898789 |

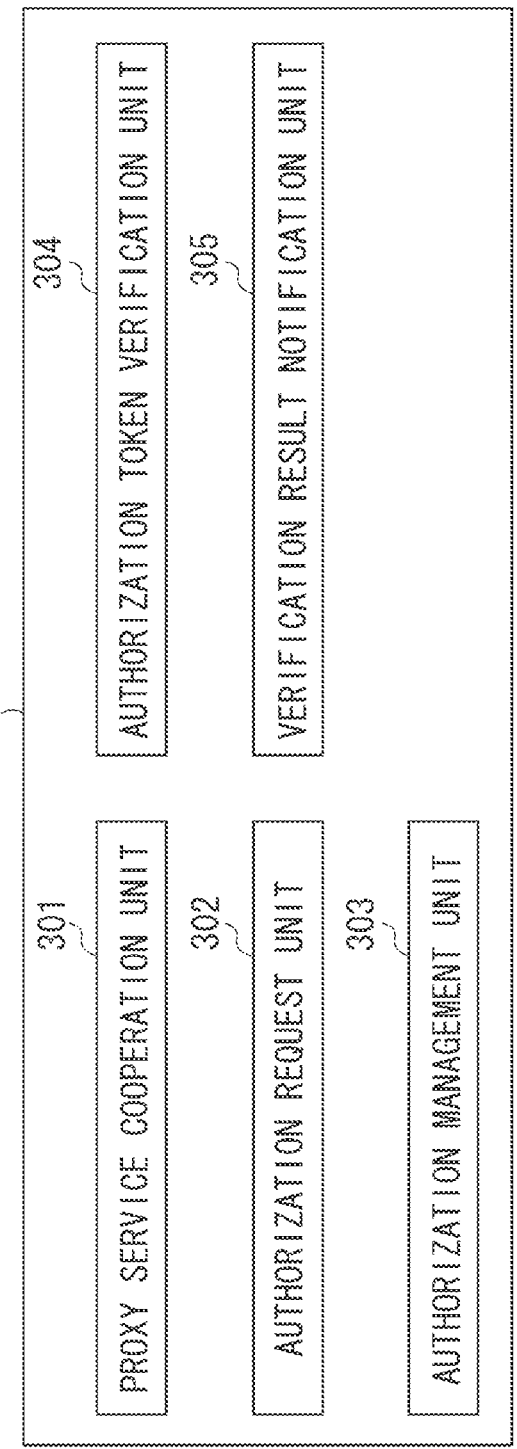
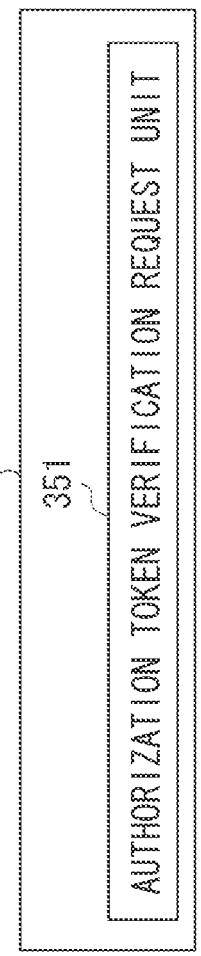

AUTHORITY DELEGATE SYSTEM, SERVER SYSTEM IN AUTHORITY DELEGATE SYSTEM, AND CONTROL METHOD FOR CONTROLLING AUTHORITY DELEGATE SYSTEM

BACKGROUND OF THE INVENTION

1. Field of the Invention

The present invention relates to an authority delegate system capable of transferring an authority of a user who accesses protected resource to another entity, a server system in the authority delegate system, and a control method for controlling the authority delegate system.

2. Description of the Related Art

As cloud computing has come to be generally used, more and more opportunities to create added values by allowing a plurality of services to cooperate with one another have increased. By allowing the services to cooperate with one another, a service provider can provide added values to users. On the other hand, some issues arise due to cooperation of the services.

More specifically, these issues include security problems such as where information more than the users desire might be exchanged among the services, and issues relating to transmission/reception of user data or personal information. For example, a plurality of services exists on the Internet, and there is a possibility that service cooperation is realized among various services, but services other than the services which the users desire should not be allowed to operate the user data or personal information.

Further, from the viewpoint of providers of services, a mechanism of the service cooperation which can be easily implemented is favorable. In such a situation, a standard protocol called OAuth for realizing cooperation of authorization is formulated.

OAuth is an open standard for authorization that allows users to share their private resources (e.g. photos, videos, contact lists) stored on one site with another site without having to hand out their credentials, typically supplying username and password tokens instead. According to the OAuth, for example, in a case where an external service B accesses data managed by a service A, an evincive authorization of the user is supposed to be obtained after making a range clear within which the data is accessed from the external service B. When a user authorizes it, the external service B receives a token which proves that the access has been accepted (hereinafter, authorization token), and subsequent access can be realized using the authorization token.

Japanese Patent Application Laid-Open No. 2009-129214 discusses a technique in which a delegate source terminal determines whether attribute information of a user of a delegate destination terminal satisfies service providing condition, and if the condition is satisfied, issues an authorization token for an accessible resource to the delegate destination terminal.

The use of an authorization token allows access to the service A by the authority of the user who has performed authorization. However, since the external service B has received authorization from the user and acquired the authorization token, the external service B has a responsibility to strictly and properly manage the authorization token.

Among services in recent years, there is a service that analyzes data which a user has and provides added values to the user. For example, an access analysis service of a website analyzes data (access log) which a user has, and thereby it can provide guideline for updating of the website to the user.

By authorizing an access analysis operator to view an access log in this way, a user can enjoy services. On the other hand, since the access log is also an important resource of the user, it is not preferable that arbitrary access analysis operators can view the access log of the user. In such a case, instead of authorizing the external service B to view the access log managed by the service A, the user needs to give authorization to individual access analysis operator that acquires the access log utilizing the external service B.

In the conventional method such as the one discussed in Japanese Patent Application Laid-Open No. 2009-129214, it is possible to give authorization to allow the access log managed by the service A to be viewed from the external service B. Further, validity of a token user can be also confirmed at the time of token issuance. However, a control relating to sharing at the time of usage of the issued authorization token is not available. Therefore, a usage range of the authorization token cannot be changed in a flexible way and it lacks convenience.

Further, if there is a plurality of access analysis operators which desire to request an analysis of the access log, it becomes necessary to individually perform the authorization operation. As a result, there is a problem that the more operators, the less convenience becomes.

SUMMARY OF THE INVENTION

According to an aspect of the present invention, an authority delegate system including a first server system configured to manage specific information, a second server system configured to provide a service using acquired specific information, an authentication device, and a client operated by a first user who is allowed to use the service, the authority delegate system includes a reception unit configured to receive a shared range of an authorization token for authorizing usage of the specific information managed by the first server system, a transmission unit configured to transmit to the client a setting screen for setting whether to permit users within the shared range to share the authorization token, based on the received shared range, a management unit configured to manage the shared range of the authorization token set by the first user via the transmitted setting screen, and the authorization token issued by the authentication device, in association with each other, a determination unit configured to determine, in response to a second user requesting to use the service, whether the second user is included in a shared range of an authorization token used by the second server system, and a provision unit configured to provide, in response to the determination unit determining that the second user is included in the shared range of the authorization token and confirmation that the authorization token is valid, the service to the second user using the specific information acquired by the second server system from the first server system.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a block diagram illustrating a configuration of a personal computer (PC) according to a first exemplary embodiment.

FIGS. 4A, 4B, and 4C are flowcharts illustrating flows from setting of shared range to authorization operation according to the first exemplary embodiment.

FIGS. 6A and 6B are flowcharts illustrating issuance flows of an authorization token according to the first exemplary embodiment.

FIG. 8 is a table illustrating a data example for managing the shared range and the authorization token according to the first exemplary embodiment.

FIGS. 9A, 9B, and 9C are block diagrams illustrating module configurations according to a second exemplary embodiment.

FIGS. 10A, 10B, 10C, and 10D are flowcharts illustrating flows from setting of the shared range to acquisition of the authorization token according to the second exemplary embodiment.

FIGS. 12A and 12B are tables illustrating data examples for managing the shared range and the authorization token according to the second exemplary embodiment.

FIGS. 13A, 13B, and 13C are block diagrams illustrating module configurations according to a third exemplary embodiment.

DESCRIPTION OF THE EMBODIMENTS

Various exemplary embodiments, features, and aspects of the invention will be described in detail below with reference to the drawings. In an example, a proxy sets a shared range of an authorization token, and presents the set shared range to customers. After obtaining an authorization of the customers, the proxy performs control so that the customers can share the authorization token within a range that the customers have authorized.

Figure 1:
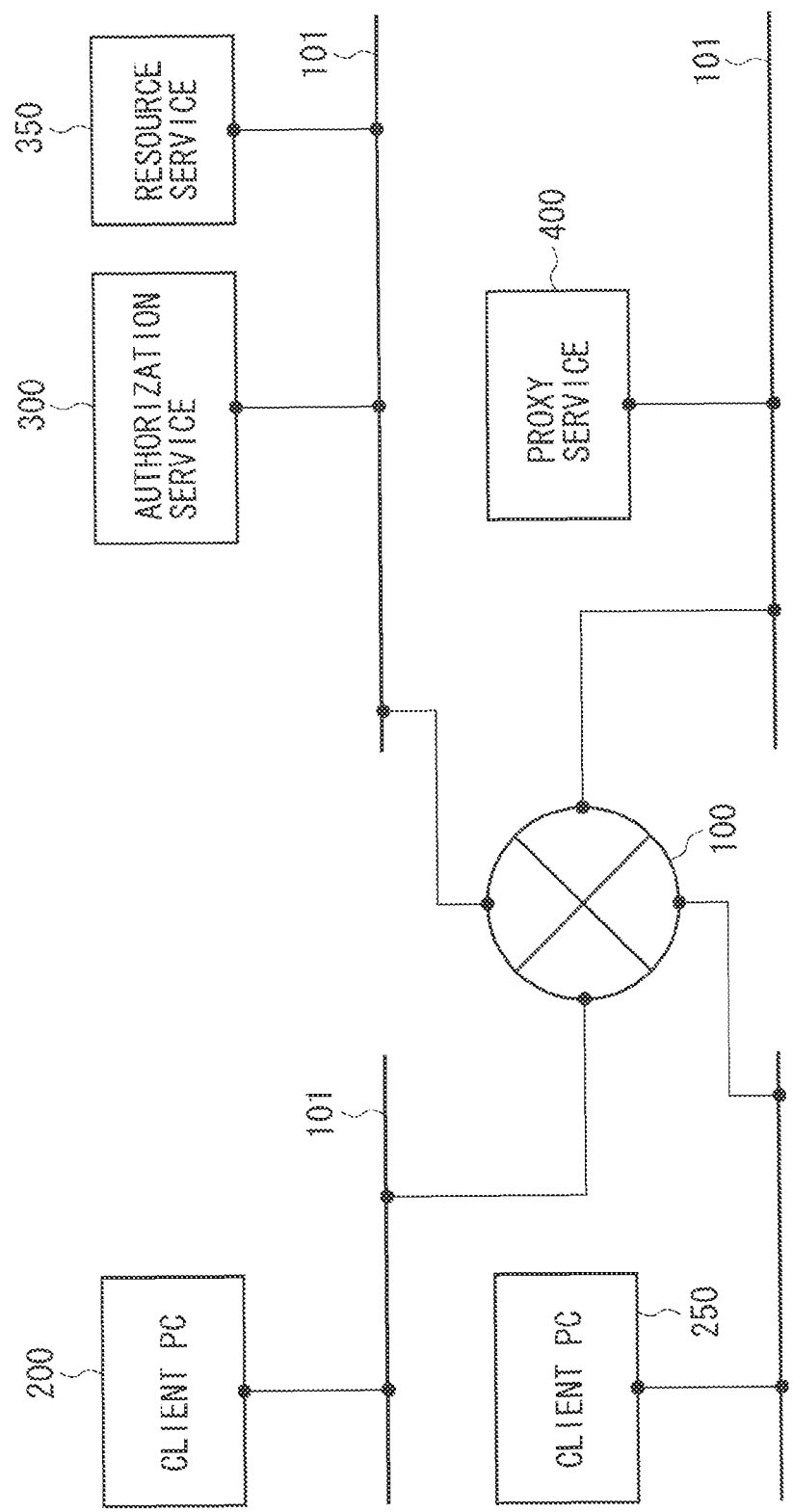
FIG. 1 is a block diagram illustrating a network configuration.

An authority delegate system according to a first exemplary embodiment is realized on a network with a configuration as illustrated in FIG. 1. A Wide Area Network (WAN) 100 includes a World Wide Web (WWW) system in the present exemplary embodiment. A local area network (LAN) 101 connects respective components to one another.

The configuration in FIG. 1 includes client personal computers (PCs) 200 and 250 that are operated by a user and a proxy, respectively, an authorization service 300, and a resource service 350. The authority delegate system also includes a proxy service 400. A proxy operating the client PC 250 may be an agent, or substitute, authorized to act for another. The proxy service 400 is a server (a computer system or an application) that acts as an intermediary for requests from clients seeking resources from other servers. Here, the proxy service 400 is used by the proxy to access the resource service 350 through client PC 250 as a user, based on an authorization of the user of client PC 200. The resource service 350 is protected so that resource associated with the user of client PC 200 residing under the control of the resource service 350 may not be used by other users. Specific information is a portion of the resource associated with the user of client PC 200, and the entity of data of the specific information may be any data. For example, data or information relating to running status of a device, or information relating to amounts of remaining toner which printers possess is conceivable. The specific information is a broader concept including such information.

Further, the client PCs 200 and 250, the authorization service 300, the resource service 350, and the proxy service 400 are connected to one another via the WAN network 100 and the LAN 101, respectively.

The client PCs 200 and 250 and their services may be each configured on a separated LAN, or may be configured on the same LAN or on the same PC. The authorization service 300, the resource service 350, the proxy service 400 are synonymous with an authorization server system, a resource server system, and a proxy server system, respectively.

These server systems may be composed of one computer, or may be configured as one computer by virtualizing a plurality of computers. Further, a server system including computers having the similar functions operating in parallel to process many requests in parallel by distributed processing may be used.

On behalf of a user who uses the resource service 350, in a case where a proxy performs substitution in carrying out a job, permission of substitution is realized according to the following procedure. The user who uses the resource service 350 corresponds to a first user, and a proxy who uses the resource service 350 on behalf of the first user corresponds to a second user. The proxy as the second user uses services of the proxy service 400, causes the proxy service 400 to manipulate data provided by the resource service 350, and provides a result of the output to a customer who corresponds to the first user.

First, the proxy service 400 receives via the client PC 250 operated by the proxy, setting of sharing which user's authorization token among which proxies. Next, the proxy service 400 receives an access of the first user, and asks the first user for permission of the shared range of the authorization token which the proxy as the second user has set.

In this case, when the first user permits the shared range, the proxy service 400 requests the authorization service 300 for an issuance of an authorization token which will be used in the permitted shared range. The issued authorization token is stored in association with pair of the first user and the shared range of the authorization token.

Furthermore, the proxy service 400 accesses the resource service 350 on behalf of the first user, based on the proxy's instruction. In this case, the access to the resource service 350 may be such that the proxy registers on the resource service 350, for example, data which the user has registered on the proxy service. Alternatively, it may be another access.

In this way, essentially the one who can use the service is only a service user. However, embodiments work towards allowing the proxy, who enjoys the service on behalf of the service user, to enjoy in a limited way the service which only the user can enjoy. As a result, the proxy becomes able to create a new result based on the enjoyed service, and to provide more fulfilling result to the user.

In particular, if the first user is a customer, and the proxy who corresponds to the second user is an agent that specializes in the proxy service, the effect will be produced more markedly. Normally, proxy agents engage in more professional service jobs than customers, and further can create high-quality results. From the above viewpoints, in the days ahead opportunities in which customers use proxy agents to get services will be further increased.

In addition, the authorization token is information for allowing a device, to which an authority has been transferred, to use a service or to access the data within a range of the transferred authority. Formats in which the authorization token may be expressed have no limits, and may include digit strings, character strings, mixtures of these pieces of information, and even combinations of other specific information.

The validity of the authorization token is verified by the authorization service 300. When the authorization token is verified to be valid, the device to which the authority has been transferred can use services or the like within a range of the transferred authority.

FIG. 2 is a block diagram illustrating a configuration of the client PC 200 according to the present exemplary embodiment. Further, a configuration of the client PC 250, the authorization service 300, the resource service 350, and the proxy service 400 that a server computer provides, or a computer that constitutes the server system is also similar to the configuration of the client PC 200.

The hardware block diagram illustrated in FIG. 2 corresponds to a hardware block diagram of a general information processing device, and a hardware configuration of general information processing device can be applied to the client PC 200 and the server computer according to the present exemplary embodiment.

In FIG. 2, a central processing unit (CPU) 201 executes programs such as an operating system (OS) or applications stored in a program ROM of a read only memory (ROM) 203, or loaded from a hard disk 211 to a random-access memory (RAM) 202. A bus 204 connects respective components to one another. The processing in the respective flowcharts described below can be realized by executing the program.

The RAM 202 serves as a main memory, a work area, and the like of the CPU 201. A keyboard controller (KBC) 205 controls a key input from a keyboard (KB) 209 or a pointing device (not illustrated). A cathode-ray tube (CRT) controller (CRTC) 206 controls a display of a CRT display 210.

A disk controller (DKC) 207 controls data accesses in a hard disk (HD) 211 and a floppy (registered trademark) disk (FD) that store various types of data. A network controller (NC) 212 is connected to a network, and executes communication control processing with other devices connected to the network.

In descriptions provided below, a component of execution in terms of hardware is the CPU 201 unless otherwise specified, and a main component in terms of software is an application program installed on the hard disk (HD) 211.

Figure 3A:
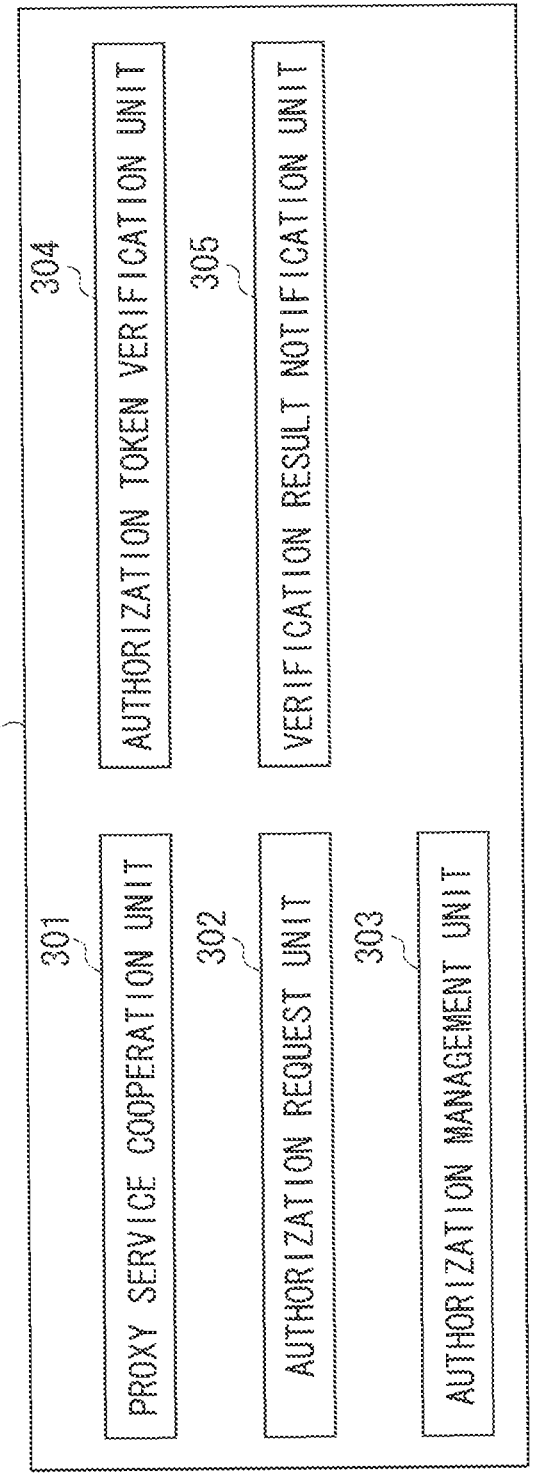
FIGS. 3A, 3B, and 3C are block diagrams illustrating module configurations according to the first exemplary embodiment.
Figure 3B:
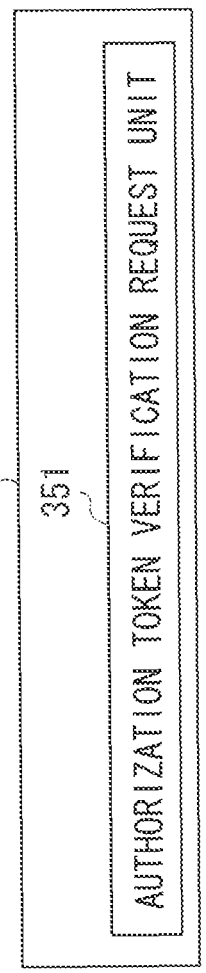
Figure 3C:
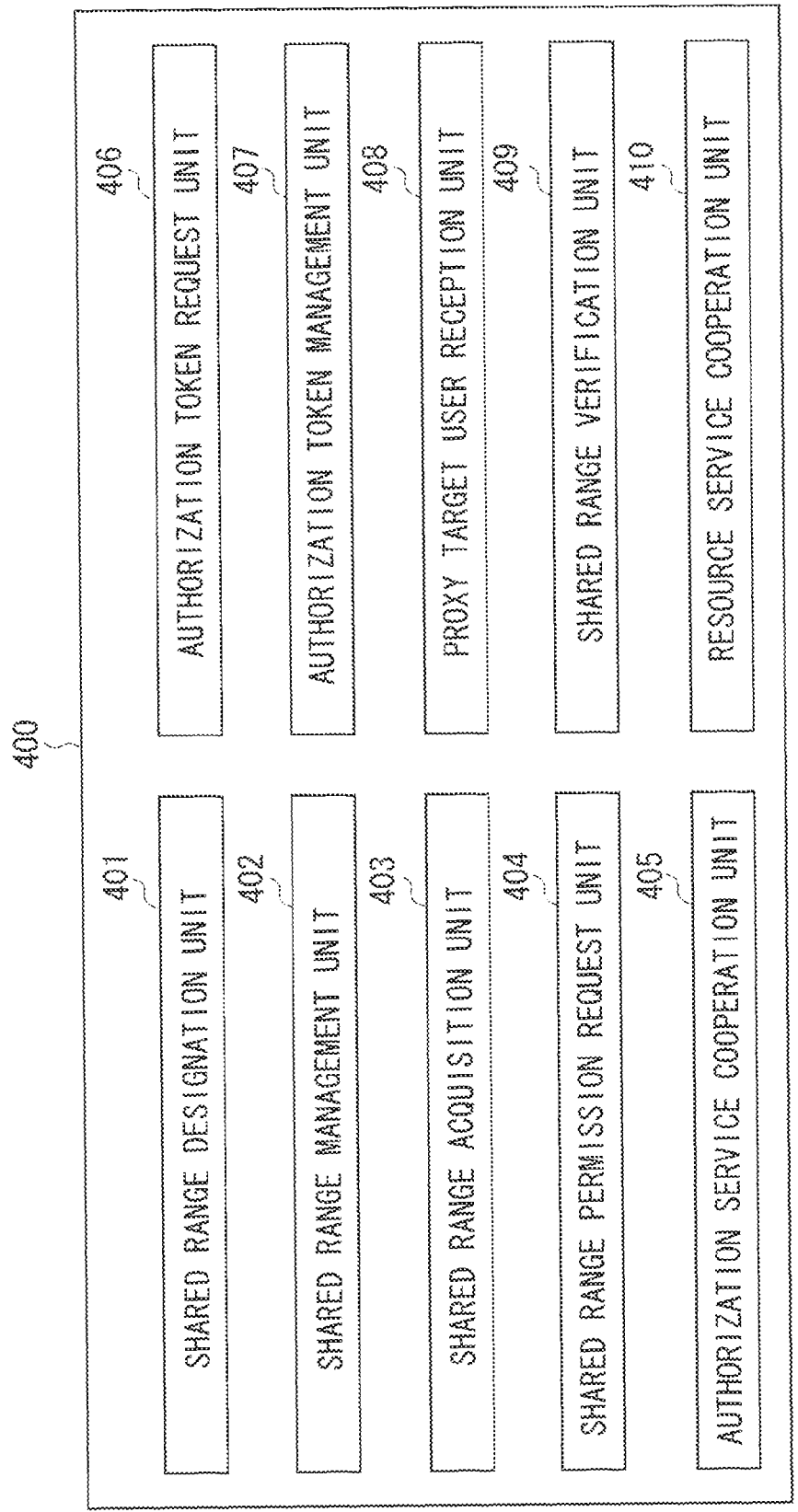

FIGS. 3A, 3B, and 3C are block diagrams illustrating module configurations of the authorization service 300, the resource service 350, and the proxy service 400 according to the present exemplary embodiment. As described above, a program for realizing these module configurations is loaded into a memory, and these module configurations are realized by causing the CPU 201 to execute the program.

FIG. 3A is a block diagram illustrating a module configuration of the authorization service 300 according to the present exemplary embodiment. The authorization service 300 includes a proxy service cooperation unit 301, an authorization request unit 302, an authorization management unit 303, an authorization token verification unit 304, and a verification result notification unit 305. The authorization request unit 302 presents an authorization screen 1001 (FIG. 5B) to the user and requests the user for an authorization of the authority transfer.

The proxy service cooperation unit 301 returns an authorization token stored in the authorization management unit 303 according to an authorization operation identifier received from the proxy service 400. The authorization token verification unit 304 verifies the authorization token received from the resource service 350, and a verification result notification unit 305 returns a verification result to the resource service 350.

FIG. 3B is a block diagram illustrating a module configuration of the resource service 350 according to the present exemplary embodiment. The resource service 350 includes an authorization token verification request unit 351. The authorization token verification request unit 351 requests the authorization service 300 to verify whether the authorization token received from the proxy service 400 is valid.

FIG. 3C is a block diagram illustrating a module configuration of the proxy service 400 according to the present exemplary embodiment. The proxy service 400 includes a shared range designation unit 401, a shared range management unit 402, a shared range acquisition unit 403, and a shared range permission request unit 404. Further, the proxy service 400 includes an authorization service cooperation unit 405, an authorization token request unit 406, an authorization token management unit 407, a proxy target user reception unit 408, a shared range verification unit 409, and a resource service cooperation unit 410.

The shared range designation unit 401, by designation of a shared range from the proxy, receives the shared range of the authorization token, and the shared range management unit 402 stores and manages the shared range that defines a range within which the authorization token can be used. In response to an access by the user, the shared range acquisition unit 403 extracts the shared range managed by the shared range management unit 402, and the shared range permission request unit 404 presents a shared range confirmation screen 1000 (FIG. 5A) to the user and asks the user for permission of the shared range.

The shared range confirmation screen 1000 is a screen generated based on the shared range managed in association with the authorization token by the shared range management unit 402, and is a setting screen which allows setting of the shared range of the authorization token. The authorization service cooperation unit 405 redirects the access of the user to the authorization service 300, and receives an authorization operation identifier as a response.

The authorization token request unit 406 requests the authorization service 300 for issuance of the authorization token using the authorization operation identifier which the authorization service cooperation unit 405 has received. The authorization token management unit 407 stores the issued authorization token.

The shared range management unit 402 and the authorization token management unit 407 are configured to be segmented from each other, but may be merged into one as a management unit. In any case, an authorization token can be managed in association with a shared range corresponding to the authorization token so that their correspondence can be identified.

The proxy target user reception unit 408 receives an access of the proxy. The shared range verification unit 409 verifies whether the proxy as the second user who has accessed is included in the shared range of the authorization token managed by the shared range management unit 402.

The resource service cooperation unit 410 request the resource service 350 for processing using an authorization token extracted from the authorization token management unit 407. However, as a result of verification by the shared range verification unit 409, if it is determined that the proxy as the second user who has accessed is not included in the shared range of the authorization token managed by the shared range management unit 402, the resource service cooperation unit 410 cannot use the authorization token managed by the authorization token management unit 407.

Figure 4A:
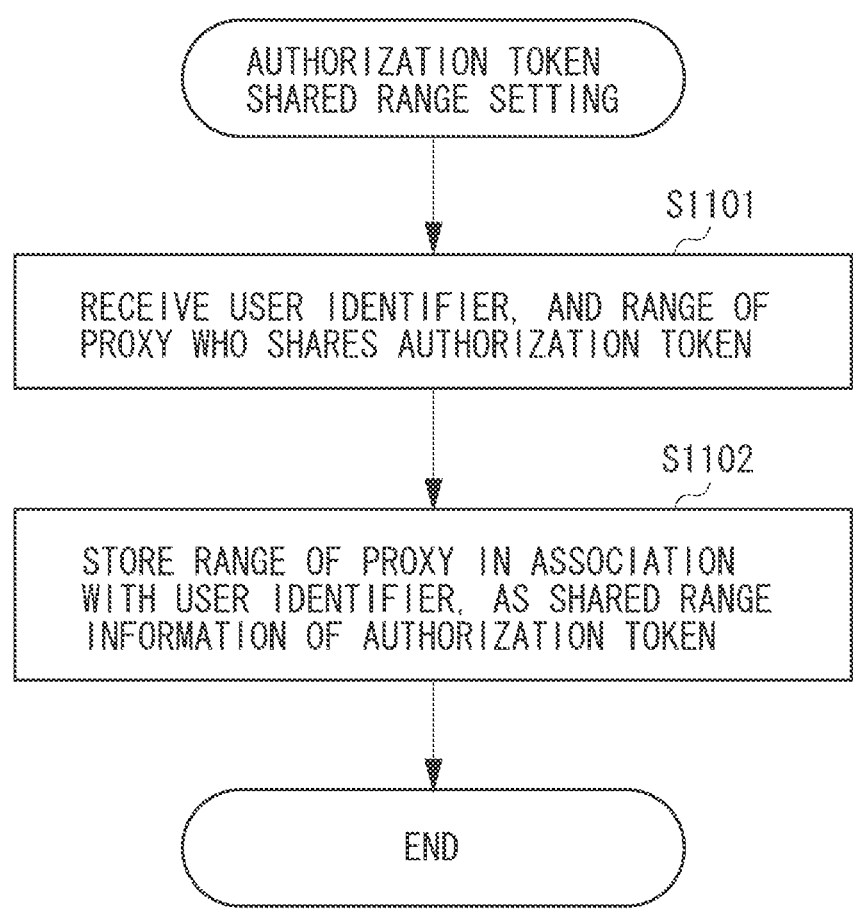
Figure 4B:
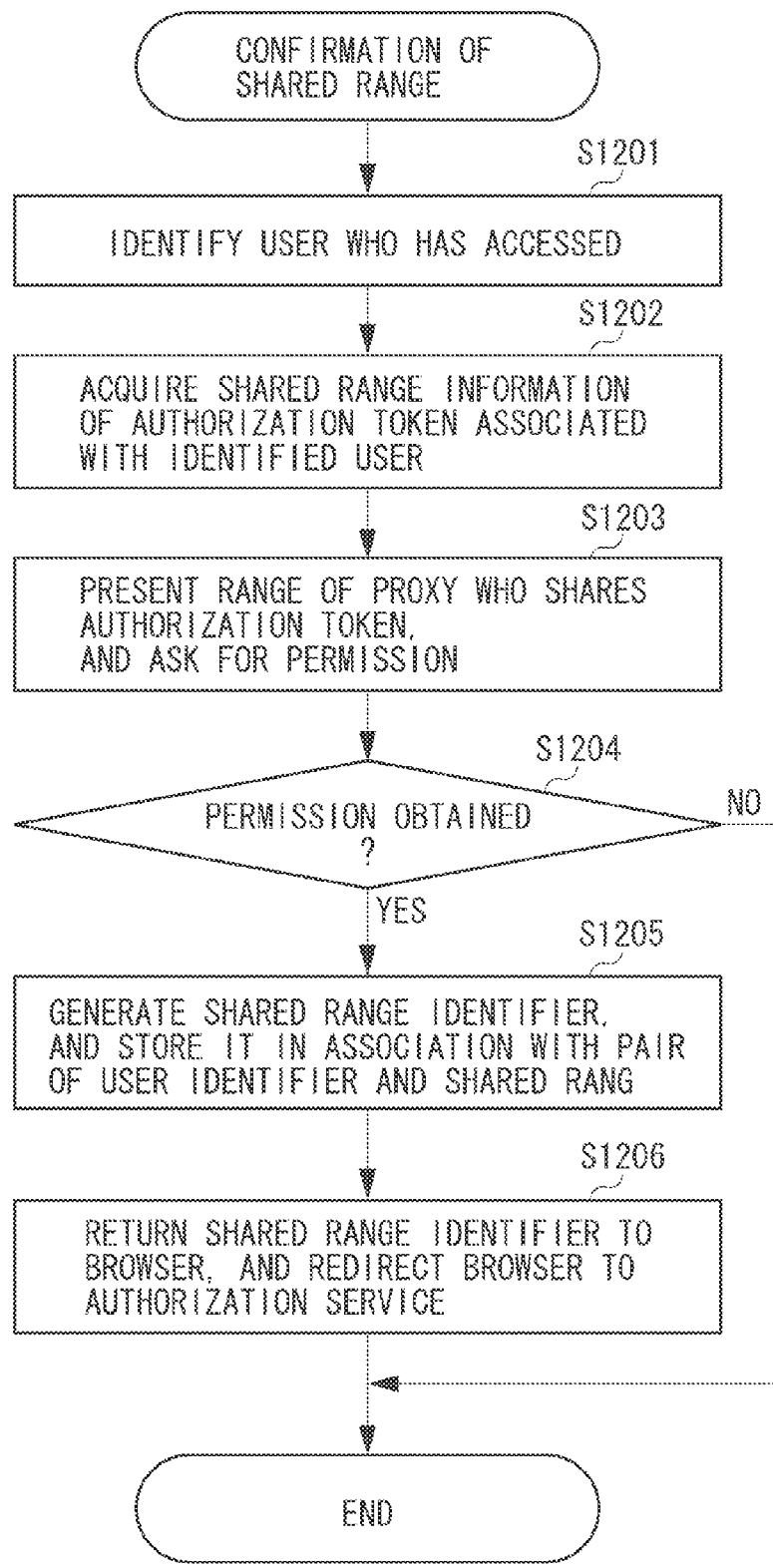

FIGS. 4A, 4B, and 4C are flows from setting of the shared range by the proxy to authorization operation by the user according to the present exemplary embodiment. First, the proxy accesses the proxy service 400, and designates a user and sets the shared range of the authorization token. Next, when the first user accesses the proxy service 400, the set shared range is displayed on the screen.

When the first user permits sharing of the authorization token within the set range, the client PC 200 operated by the first user is redirected to the authorization service 300. When the user performs authorization operation using the authorization service 300, an authorization operation identifier is issued, and the client PC 200 is instructed by the authorization service 300 to redirect to the proxy service 400. Then, the authorization operation identifier issued by the authorization service 300 is transmitted to the proxy service 400.

FIG. 4A is a setting flow of the authorization token shared range by the proxy in the proxy service 400 according to the present exemplary embodiment. In step S1101, the shared range designation unit 401 in the proxy service 400 receives a user identifier indicating which user's authorization token the user wants to share, and users who share the authorization token of the user, that is, the shared range of the proxy, via the client PC 250 of the proxy.

In step S1102, the shared range management unit 402 stores the setting of the shared range of the proxy received in step S1101 as the shared range of the authorization token, in association with the user identifier received in step S1101.

FIG. 4B is a confirmation and permission flow of an authorization token shared range by the first user in the proxy service 400 according to the present exemplary embodiment. When the proxy has finished shared range preparation, the first user performs confirmation and permission of the shared range. The fact that the proxy has finished the shared range preparation may be notified to the user via telephone or electronic mail, or may be notified via other ways. The first user who has received the notification is supposed to attempt an access to the proxy service 400.

The following flow is a flow in which the proxy service 400 requests the user to permit the shared range of the authorization token. The flow is started by the first user accessing the proxy service 400 using a web browser of the client PC 200. An authorization token issued by the subsequent flow is a token issued in response to the fact that permission of the authority transfer has been given by the first user, and is shared and used among the proxies within the permitted range.

In step S1201, the proxy service 400 identifies the first user who has accessed. In step S1202, the shared range acquisition unit 403 acquires shared range information of the authorization token from the shared range management unit 402. The shared range information to be acquired in this process is the shared range managed in association with the user identified in step S1201.

In step S1203, the shared range permission request unit 404 presents shared range information of the authorization token acquired in step S1202 to the user, and requests the user for permission for the shared range. In other words, the shared range permission request unit 404 transmits setting screen for setting whether to give users within the shared range a permission to share the authorization token to the client PC 200 operated by the first user.

Figure 5A:
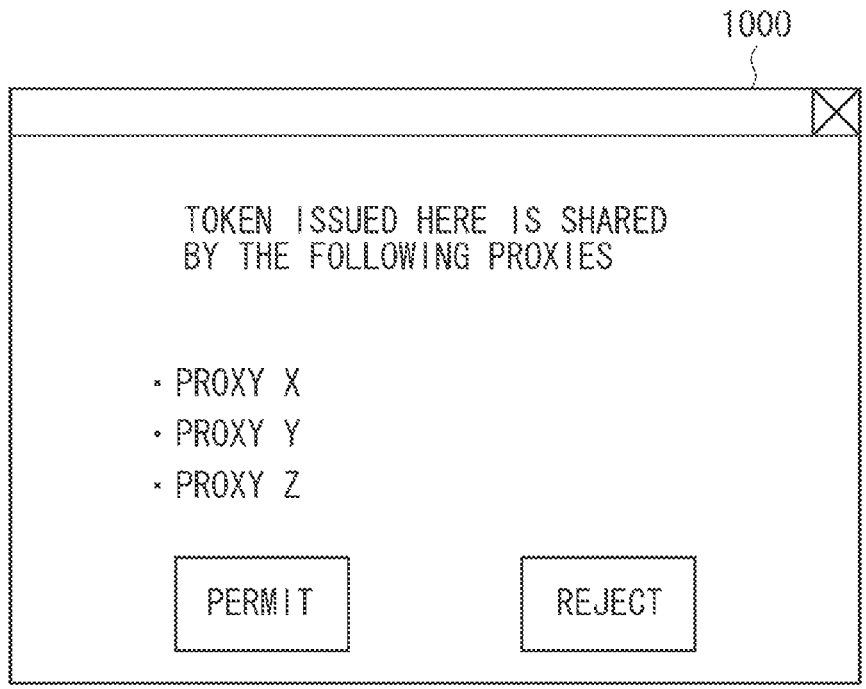
FIGS. 5A and 5B illustrate shared range presentation and authorization screen examples according to the first exemplary embodiment.

Then, the setting which has been set via the transmitted setting screen is taken as the shared range of the authorization token. For example, the shared range confirmation screen 1000 illustrated in FIG. 5A is a screen used when requesting the user for permission by a proxy X, a proxy Y, and a proxy Z to share the authorization token, and is a setting screen which allows setting of the shared range. The user is referred to as a user A.

The way how to display the setting screen is not limited thereto, and another way of displaying may be used. The details will be described below in another exemplary embodiment. In the first exemplary embodiment, it is assumed that the proxy X is an existence who belongs to a parent company of a subsidiary company to which the proxy Y and the proxy Z belong, and has designated the shared range in step S1101 as a representative of these proxies.

In step S1204, the shared range permission request unit 404 determines whether the user has permitted the shared range in step S1203. As a result of determination, if the user has permitted (YES in step S1204), the processing proceeds to step S1205. If the user has not permitted (NO in step S1204), the flow ends.

In step S1205, the shared range management unit 402 generates a shared range identifier, and stores the shared range identifier in association with pair of the user identifier and the shared range. The shared range identifier may be generated at the time of storing the pair of the user identifier and the shared range in step S1102, instead of in step S1205.

In step S1206, the authorization service cooperation unit 405 redirects the access from the first user to the authorization service 300, and ends the flow. At that time, the authorization service cooperation unit 405 redirects the access to the authorization service 300, and sends an instruction including the shared range identifier.

FIG. 4C is a confirmation flow of an authorization by the user in the authorization service 300, according to the present exemplary embodiment. The flow is started by a web browser operated by the user being redirected from the proxy service 400 to the authorization service 300. When the user performs authorization, the proxy who performs instruction to the proxy service 400 becomes able to access the resource service 350 as the user who has performed the authorization.

In step S1301, the authorization service 300 identifies the user who has been redirected from the proxy service 400 and has accessed. In step S1302, the proxy service cooperation unit 301 acquires a shared range identifier from the access. In step S1303, the authorization request unit 302 requests the user for authorization for the proxy who performs instruction to the proxy service 400 to access the resource service 350 as its user. In this process, a screen like the authorization screen 1001 illustrated in FIG. 5B is displayed.

In step S1304, the authorization request unit 302 determines whether the user has given the authorization in step S1303. If the user has given authorization (YES in step S1304), the processing proceeds to step S1305. If the user has not given the authorization (NO in step S1304), the flow ends.

Figure 5B:
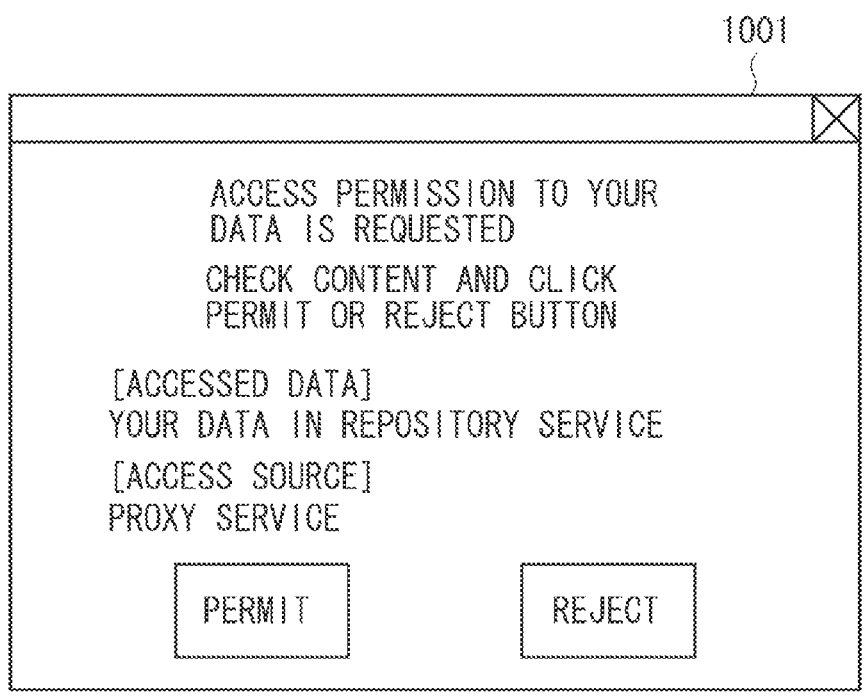

On the screen in FIG. 5B, if the user presses a permit button, the authorization is given, and if the user presses a reject button, the authorization is not given. In step S1305, the authorization management unit 303 generates and stores the authorization operation identifier corresponding to the authorization given by the user in step S1303. The authorization management unit 303 stores together additional information about the authorization, if any.

In step S1306, the proxy service cooperation unit 301 redirects the access from the user to the proxy service 400, and ends the flow. At that time, the authorization operation identifier generated in step S1305 and the shared range identifier extracted in step S1302 are included in the instruction for redirection.

Figure 6B:
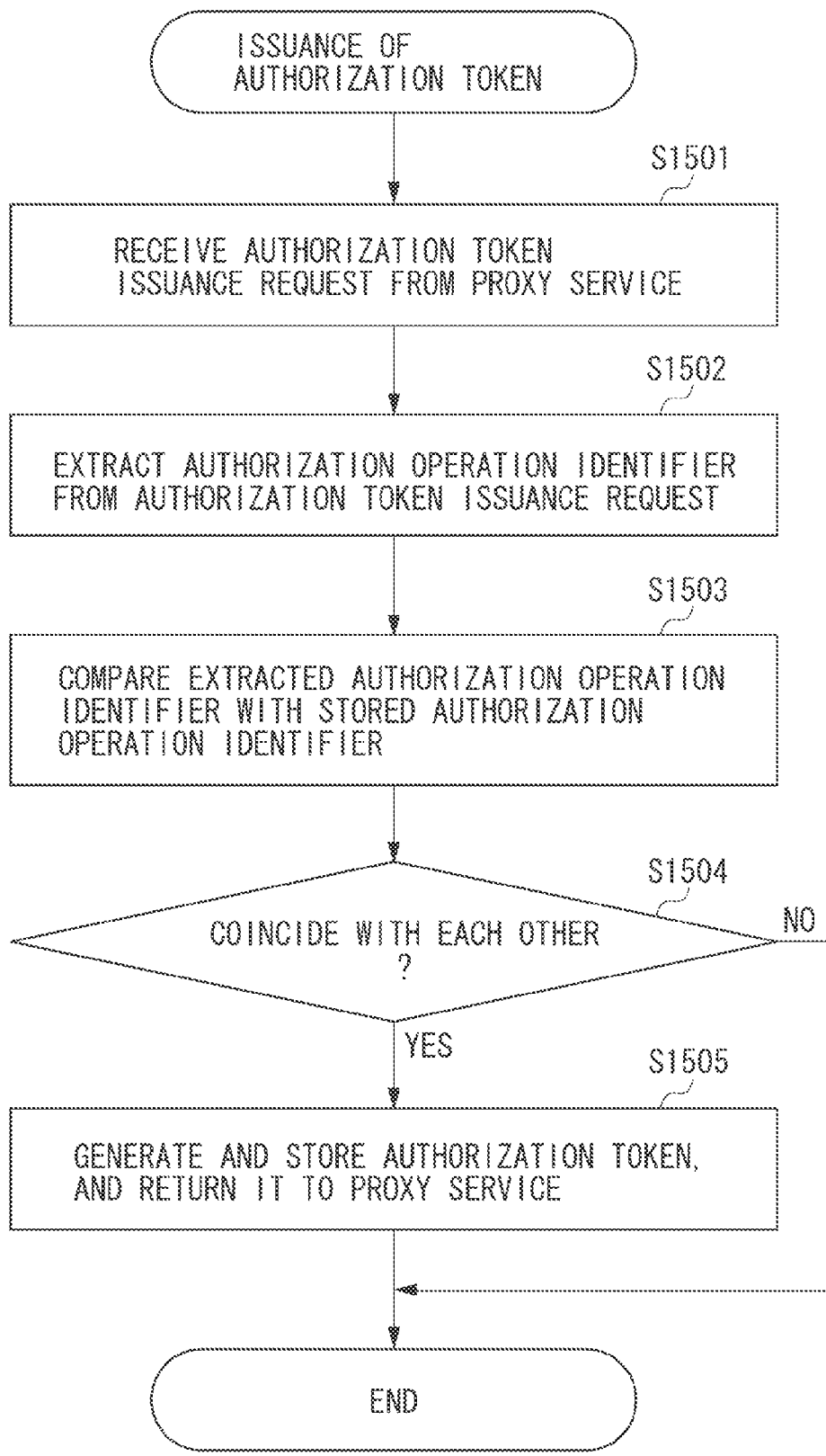

FIGS. 6A and 6B are flows in which the proxy service 400 requests the authorization service 300 to issue an authorization token, and the authorization service 300 issues the authorization token, according to the present exemplary embodiment. FIG. 6A is a flow in which the proxy service 400 requests the authorization service 300 to issue an authorization token, and acquires the authorization token, according to the present exemplary embodiment.

The flow is started by a web browser operated by the user finishing the authorization operation in the authorization service 300, and being redirected from the authorization service 300 to the proxy service 400. In step S1401, the proxy service 400 identifies the user who has been redirected from the authorization service 300 and has accessed.

In step S1402, the authorization service cooperation unit 405 extracts an authorization operation identifier and a shared range identifier from a redirect instruction. In step S1403, the authorization token request unit 406 transmits the authorization operation identifier extracted in step S1402 to the authorization service 300, and receives the authorization token as a response. In step S1404, the authorization token management unit 407 identifies a pair of the user identifier stored in the shared range management unit 402 and the shared range of the authorization token, using the shared range identifier extracted in step S1402.

In step S1405, the authorization token management unit 407 manages the pair of the user identifier and the shared range of the authorization token identified in step S1404, in association with the authorization token acquired in step S1403. Upon completion of storage of the authorization token, the flow ends.

FIG. 6B is a flow in which the authorization service 300 issues an authorization token, according to the present exemplary embodiment. In step S1501, the authorization service 300 receives an authorization token issuance request from the proxy service 400. In step S1502, the authorization service 300 extracts an authorization operation identifier from the authorization token issuance request received in step S1501.

In step S1503, the authorization management unit 303 compares the authorization operation identifier extracted in step S1502 with the authorization operation identifier stored by the authorization management unit 303. In step S1504, the authorization management unit 303 determines whether the coincident authorization operation identifier is stored, as a result comparison in step S1503. If the coincident authorization operation identifier is stored (YES in step S1504), the processing proceeds to step S1505. If the coincident authorization operation identifier is not stored (NO in step S1504), the flow ends.

In step S1505, the authorization management unit 303 generates and stores an authorization token. Further, the authorization management unit 303 returns the generated authorization token, as a response to the authorization token issuance request received in step S1501, to the proxy service 400. Upon returning the authorization token, the flow ends.

Figure 7A:
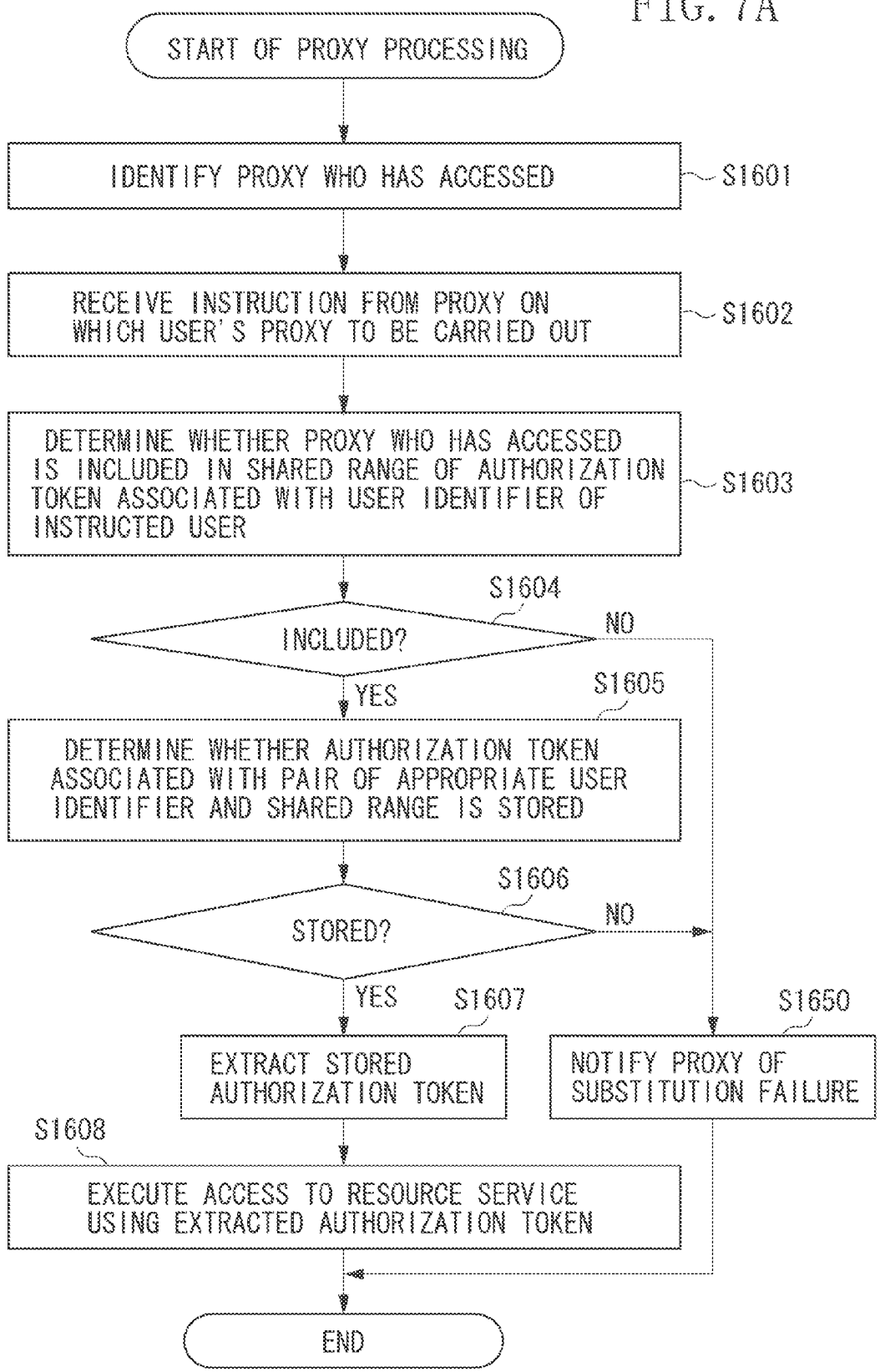
FIGS. 7A, 7B, and 7C are flowcharts illustrating processing request flows using the authorization token according to the first exemplary embodiment.
Figure 7B:
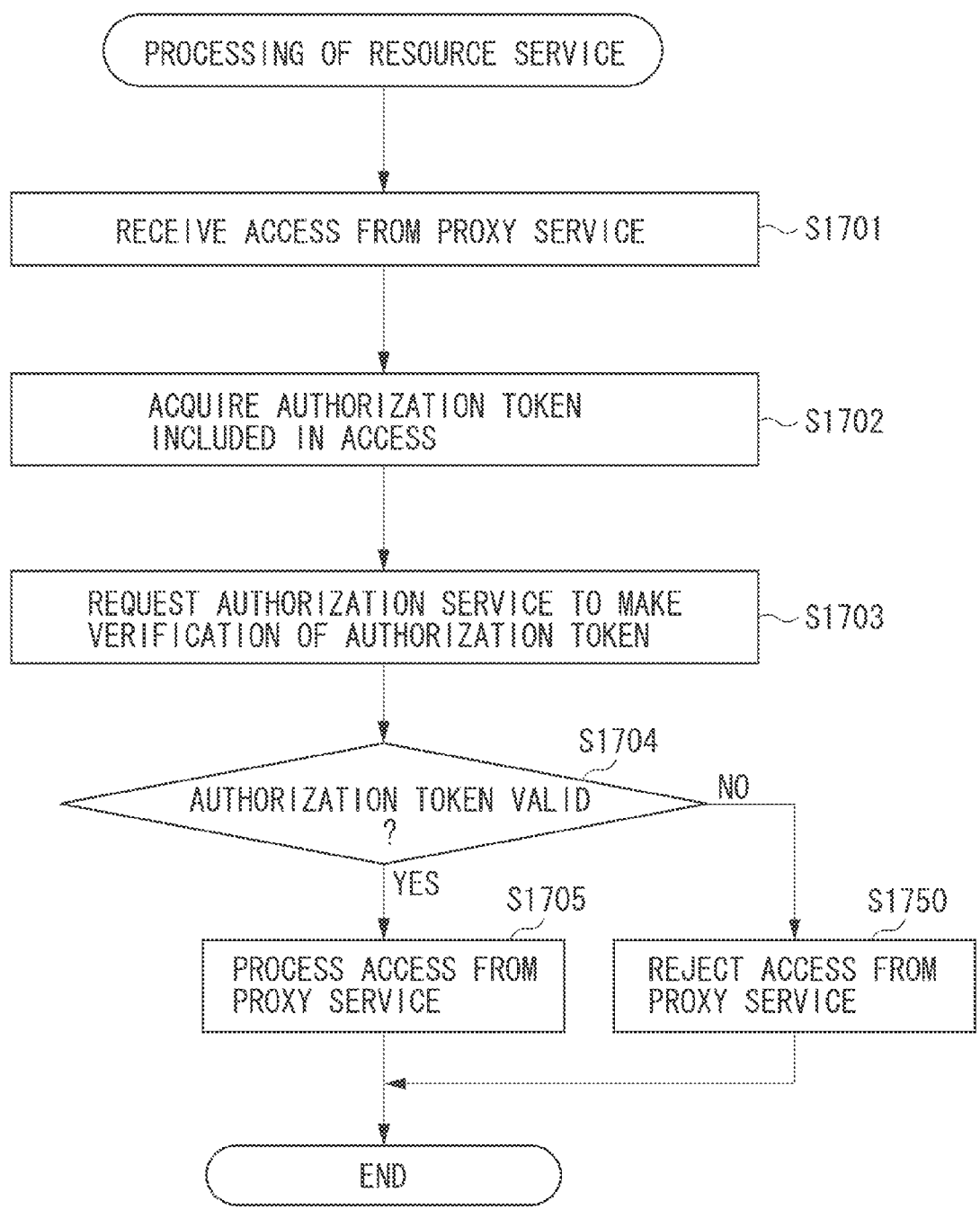
Figure 7C:
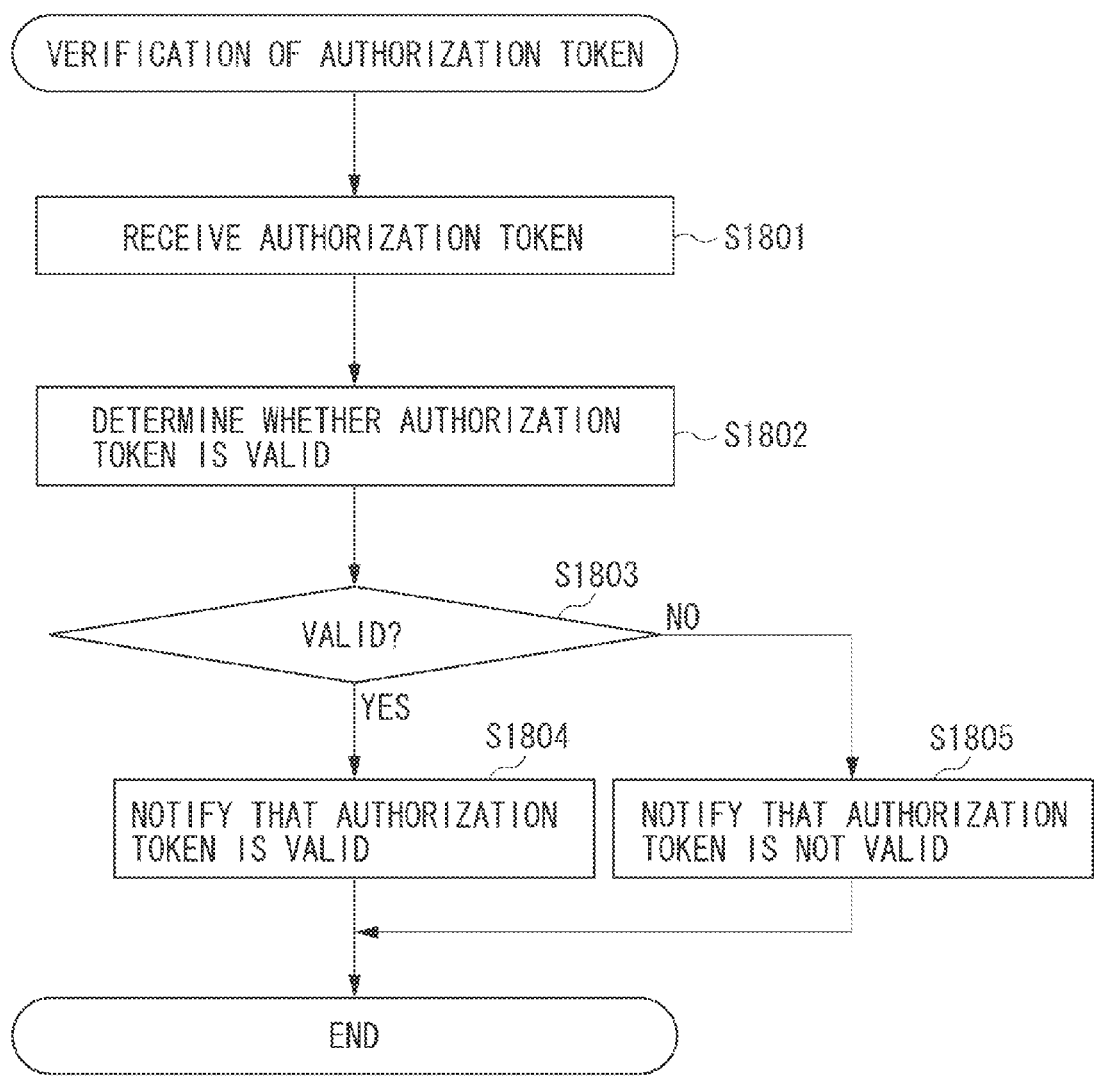

FIGS. 7A, 7B, and 7C are flows in which the proxy service 400 calls the resource service 350 and executes processing using the issued authorization token, according to the present exemplary embodiment. First, the proxy accesses the proxy service 400, and instructs the proxy service 400 to call the resource service 350 using the authorization token.

Since the call is performed using the authorization token, the call for the resource service 350 is processed as an instruction from the user associated with the authorization token. When the proxy service 400 instructs the resource service 350 for processing using the authorization token, the resource service 350 requests the authorization service 300 to verify the received authorization token. If the authorization token is valid, the resource service 350 executes processing.

FIG. 7A is a flow in which the proxy service calls the resource service, according to the present exemplary embodiment. In step S1601, the proxy service 400 identifies a proxy as a second user who has accessed in order to use a proxy service. In step S1602, the proxy target user reception unit 408 receives an instruction on which user's substitution to be carried out by the proxy who has accessed.

In step S1603, the shared range verification unit 409 inquires the shared range management unit 402, using the user identifier of the user designated in step S1602. The shared range management unit 402 checks whether there exists shared range setting of the authorization token associated with the user identifier. Furthermore, the shared range management unit 402 checks whether the proxy as the second user who has accessed in step S1601 is included in the shared range.

In step S1604, the shared range verification unit 409 performs determination based on a result of checking in step S1603. If shared range setting of the authorization token associated with the user identifier exists, and the proxy who has accessed in step S1601 is included in the shared range (YES in step S1604), the processing proceeds to step S1605. If not included (NO in step S1604), the processing proceeds to step S1650.

In step S1605, the authorization token management unit 407 checks whether an authorization token associated with a pair of the user identifier and the shared range of the authorization token is stored. In step S1606, the authorization token management unit 407 determines whether the authorization token is stored. If the authorization token is stored (YES in step S1606), the operation proceeds to step S1607. On the other hand, if not stored (NO in step S1606), the processing proceeds to S1650.

In this way, the authorization token management unit 407 determines whether the proxy as the second user is included in the shared range of the authorization token used by the server system of the proxy service if the proxy as the second user uses the proxy service. The determination method is not limited to this, and another method will be described below in another exemplary embodiment.

In step S1607, the authorization token management unit 407 extracts the stored authorization token. In step S1608, the resource service cooperation unit 410 performs access to the resource service 350, using the authorization token extracted in step S1607. Upon completion of the access, the flow ends.

In step S1650, the proxy service 400 notifies the proxy that the proxy cannot be performed and ends the processing. The conceivable reasons why the proxy cannot be performed would include such situations that the proxy in the first place was not a subject of the proxy at the setting stage of the shared range, or the proxy was set within the shared range but was not permitted by the first user. The embodiments can flexibly set a range within which the authorization token can be shared, by the above-described configurations and processing.

FIG. 7B is a processing flow of the resource service 350, according to the present exemplary embodiment. In step S1701, the resource service 350 receives an access from the proxy service 400. In step S1702, the authorization token verification request unit 351 extracts an authorization token from the access in step S1701.

In step S1703, the authorization token verification request unit 351 requests the authorization service 300 to verify validity of the authorization token extracted in step S1702, and receives a verification result from the authorization service 300. In step S1704, the authorization token verification request unit 351 confirms the verification result received in step S1703. If the verification result is that the authorization token is valid (YES in step S1704), the processing proceeds to step S1705. On the other hand, if the result is that the authorization token is not valid (NO in step S1704), the processing proceeds to step S1750.

In step S1705, the resource service 350 processes the access received from the proxy service 400 in step S1701. Upon completion of the processing, the resource service 350 returns the result to the proxy service 400, and ends the flow. In step S1750, the resource service 350 rejects the access received from the proxy service 400 in step S1701, and ends the flow.

FIG. 7C is a flow of validity verification of the authorization token in the authorization service 300, according to the present exemplary embodiment. In step S1801, the authorization service 300 receives an authorization token from the resource service 350. In step S1802, the authorization token verification unit 304 determines whether the authorization token received in step S1801 is valid.

In the determination in this process, determination is performed whether, for example, the authorization token is the same as the one managed by the authorization management unit 303, or if managed, whether the authorization token is within an expiration time. In this way, not only a content of an authorization token can be confirmed, but also expiration date for use of the authorization token can be confirmed.

In step S1803, as a result of the determination in step S1803, if the authorization token which the authorization token verification unit 304 has received in step S1801 is valid (YES in step S1803), the processing proceeds to step S1804. On the other hand, if the authorization token is not valid (NO in step S1803), the processing proceeds to step S1805. In step S1804, the verification result notification unit 305 notifies the proxy service 400 that the authorization token is valid and ends the processing.

In step S1805, the verification result notification unit 305 notifies the proxy service 400 that the authorization token is not valid and ends the processing.

FIG. 8 is an example of the data managed by the proxy service 400 according to the present exemplary embodiment. The example illustrates a situation in which the proxy X and the proxy Y share an authorization token of a user K, and the shared range is identified by a shared range identifier abc0001.

Also, the example illustrates a situation in which a pair of the user identifier and the shared range of the authorization token is stored, in association with the authorization operation identifier 111110-122334 and the authorization token 987654321. In that case, the proxy X and the proxy Y can instruct the resource service 350 to perform the processing from the proxy service 400, on behalf of the user K, using the authorization token 987654321.

However, since the proxy Z is not included in the authorization token shared range, the proxy Z cannot instruct the resource service 350 to perform the processing from the proxy service 400 on behalf of the user K. For example, the proxy Z corresponds to the one via step S1650 in FIG. 7A.

As illustrated in FIG. 5, in the case of requesting the user A for use permission of the proxy X, the proxy Y, and the proxy Z, a user identifier corresponding to the user A, and three proxies as authorization token shared range will be associated with the user A. As a result, three proxies become able to provide proxy service to the user A.

According to the present exemplary embodiment, even when a plurality of proxies performs work on behalf of the user, the user does not need to perform authorization operation for each proxy, and the plurality of proxies becomes able to share the authorization token. Further, since the proxies who can use the authorization token are limited by the authorization token shared range, a problem that an unspecified number of proxies use the authorization token does not also arise. Further, since the shared range of the authorization token is specified to the user and is requested for its permission from the user, the user can be also aware of the authorization for the proxies.

Next, a second exemplary embodiment will be described below with reference to the drawings. In the second exemplary embodiment, setting and verification of the shared range of the authorization token are performed by the authorization service 300. By integrating them into the authorization service 300, the situation where the proxy service 400 unintentionally or intentionally makes wrong verification of the shared range, or a proxy whom the service user does not desire accesses the resource service 350 can be prevented, compared with the case where the proxy service 400 performs verification of the shared range of the authorization token.

In a mechanism of general OAuth, both the first user as the service user, and the second user as the proxy directly operate the proxy service 400. Consequently, the proxy service 400 retains an identifier which identifies the service user and the proxy.

On the other hand, since the authorization service 300 and the resource service 350 are in no way accessed by the proxy using an identifier of the proxy, they do not retain the identifier of the proxy. However, by the reason that, for example, the proxy service 400 belongs to the same security domain as that of the authorization service 300 and the resource service 350, a case where the authorization service 300 retains the identifier of the proxy is also considered.

In that case, even the authorization service 300 can perform setting and verification of the shared range of the authorization token. The second exemplary embodiment assumes such a situation.

Next, a description of the second exemplary embodiment will be given, and regarding common parts with the first exemplary embodiment, redundant descriptions thereof will be avoided. Hereinbelow, only different parts will be described. FIGS. 9A, 9B, and 9C are diagrams illustrating module configurations of the authorization service 300, the resource service 350, and the proxy service 400 according to the second exemplary embodiment.

FIG. 9A is a diagram illustrating a module configuration of the authorization service 300 according to the second exemplary embodiment. The authorization service 300 includes the authorization request unit 302, the authorization management unit 303, the authorization token verification unit 304, and the verification result notification unit 305. Further, the authorization service 300 includes a second shared range designation unit 306, a second shared range management unit 307, and a second proxy service cooperation unit 308. Further, the authorization service 300 includes a second shared range acquisition unit 309, a second shared range permission request unit 310, and a second shared range verification unit 311.

The second shared range designation unit 306 receives an instruction of a shared range from the proxy, and stores the shared range in the second shared range management unit 307. When the user who is using the service accesses the authorization service 300 by redirection from the proxy service 400, the second shared range acquisition unit 309 extracts the shared range stored by the second shared range management unit 307, and the second shared range permission request unit 310 presents the shared range confirmation screen 1000 to the user and asks the user for permission of the shared range.

The second shared range verification unit 311, when verifying an authorization token in response to a request from the resource service 350, verifies whether a proxy who uses the authorization token is included in the shared range.

FIG. 9B is a diagram illustrating a module configuration of the resource service 350 according to the second exemplary embodiment. The resource service 350 includes the second authorization token verification request unit 352. The second authorization token verification request unit 352 requests the authorization service 300 to verify whether the authorization token received from the proxy service 400 is valid.

FIG. 9C is a diagram illustrating a module configuration of the proxy service 400 according to the second exemplary embodiment. The proxy service 400 includes the authorization token request unit 406, and the proxy target user reception unit 408. Further, the proxy service 400 includes a second authorization service cooperation unit 411, a second authorization token management unit 412, and a second resource service cooperation unit 413.

The second authorization service cooperation unit 411 acquires an authorization token from the authorization service 300, and the second authorization token management unit 412 stores the acquired authorization token. Further, the second resource service cooperation unit 413 transmits the stored authorization token and the proxy information to the resource service 350 to request for processing.

FIGS. 10A, 10B, 10C, and 10D are flows from setting of the shared range to acquisition of the authorization token by the proxy, according to the second exemplary embodiment. First, the proxy accesses the authorization service 350, designates the first user as a user and a proxy service which the first user uses, and sets the shared range of the authorization token.

Next, when the first user accesses the proxy service 400, the client PC 200 which the first user operates is redirected to the authorization service 300. In the authorization service 300, the shared range set by the proxy is displayed on the screen.

When the first user permits sharing of the authorization token within the set range, the authorization screen is displayed. When the first user performs authorization operation, an authorization operation identifier is issued, and the authorization operation identifier is transmitted to the proxy service 400. The proxy service 400 acquires an authorization token from the authorization service 300, using the authorization operation identifier.

FIG. 10A is a setting flow of the authorization token shared range by a proxy in the authorization service 300, according to the second exemplary embodiment. In this process, the authorization service 300 retains the identifier of the proxy. To prevent a situation where a proxy, whom the service user does not desire access, may access the resource service 350, the authorization service 300 performs setting and verification of the shared range of the authorization token.

In step S2101, the second shared range designation unit 306 in the authorization service 300 receives a user identifier indicating which user's authorization token the proxies want to share, and a range of the proxies who share the user's authorization token each from the proxies. Further, the authorization service 300 calls the resource service 350 using the authorization token, and also receives a proxy service identifier indicating a proxy service.

In step S2102, the second shared range management unit 307 stores a range of the proxies received in step S2101 as the authorization token shared range, in association with the user identifier and the proxy service identifier received in step S2101, and the flow ends.

FIG. 10B is a start flow of authorization processing by a user in the proxy service 400, according to the second exemplary embodiment. When the proxy has finished shared range preparation, the user performs confirmation and permission of the shared range. The fact that the proxy has finished the shared range preparation may be notified to the user via telephone or electronic mail, or may be notified via other ways. The flow given below is a flow in which the proxy service 400 requests the user for execution of the authorization processing.

The flow is started by the first user accessing the proxy service 400 using a web browser. An authorization token issued in subsequent flow receives permission by the user, and is shared among the proxies within the permitted range and becomes usable.

In step S2201, the proxy service 400 identifies a user who has accessed thereto. In step S2202, the second authorization service cooperation unit 411 redirects the access from the user to the authorization service 300, and ends the flow. At that time, the proxy service identifier for identifying the proxy service is included in a redirect instruction.

FIG. 10C is a confirmation flow of the shared range and the authorization by the user in the authorization service 300 according to the second exemplary embodiment. The flow is started by a web browser operated by the first user being redirected from the proxy service 400 to the authorization service 300. When the first user performs authorization, the proxy who uses the service of the proxy service 400 becomes able to access the resource service 350.

In step S1301, the authorization service 300 identifies a user who has been redirected from the proxy service 400 and has accessed. In step S2301, the second proxy service cooperation unit 308 extracts a proxy service identifier included in the access.

In step S2302, the second shared range acquisition unit 309 acquires the shared range of the authorization token associated with the user identified in step S1301 and the proxy service extracted in step S2301.

In step S2303, the second shared range permission request unit 310 presents the shared range information of the authorization token acquired in step S2302 to the user, and requests the user for permission for the shared range. The screen displayed in this process is a screen similar to the shared range confirmation screen 1000 illustrated in FIG. 5A.

In step S2304, the second shared range permission request unit 310 determines whether the user has permitted the shared range in step S2303. As a result of the determination, if the user has permitted the shared range (YES in step S2304), the processing proceeds to step S1303. If the user has not permitted the shared range (NO in step S2304), the flow ends.

In step S2305, the second proxy service cooperation unit 308 redirects the access from the user to the proxy service 400, and ends the flow. At that time, the authorization operation identifier generated in step S1305 is included in the redirection.

Figure 10D:
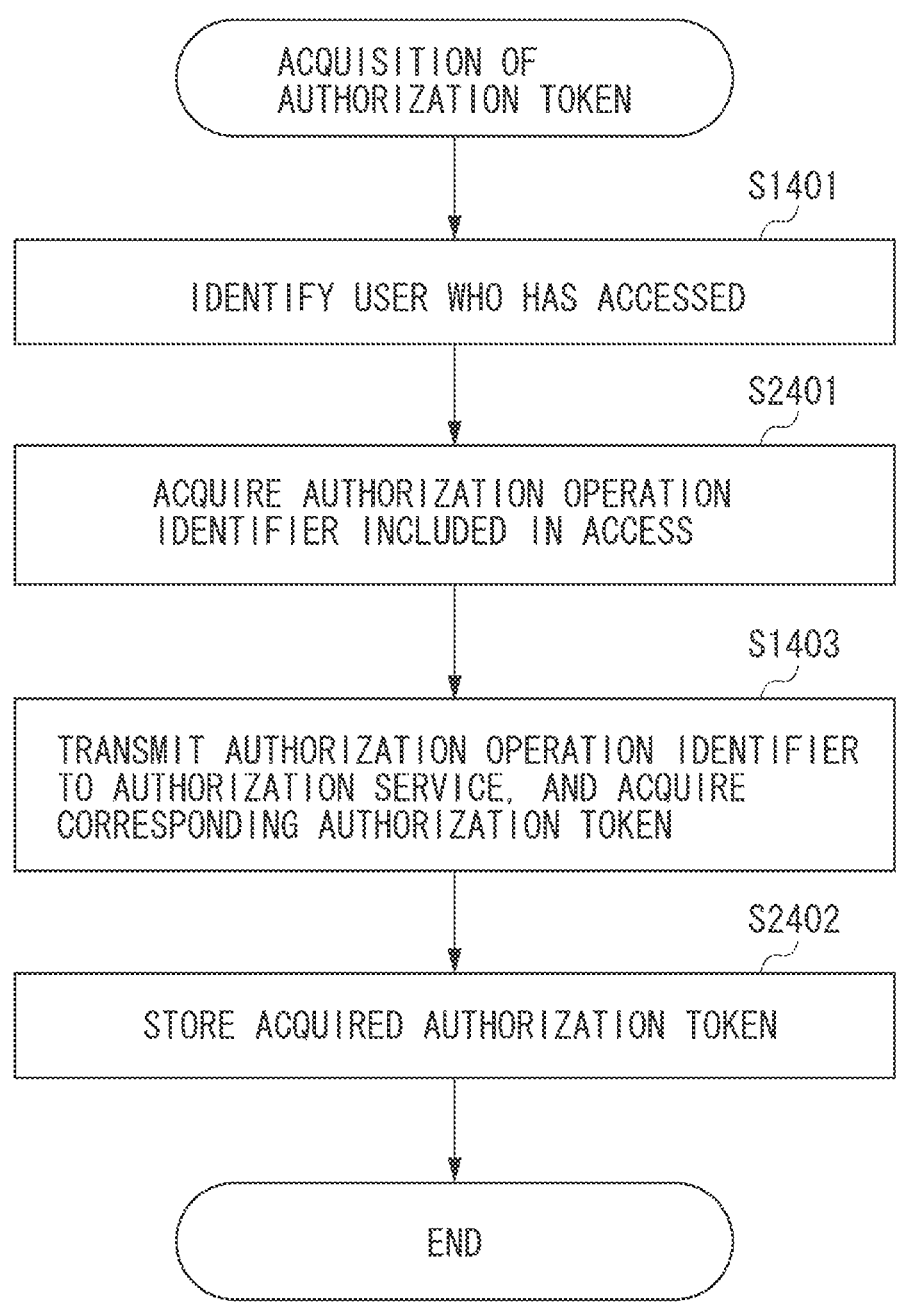

FIG. 10D is a flow in which the proxy service 400 acquires an authorization token from the authorization service 300, according to the second exemplary embodiment. The flow is started by a web browser operated by the user finishing authorization operation in the authorization service 300, and being redirected from the authorization service 300 to the proxy service 400.

In step S1401, the proxy service 400 identifies the user who has been redirected from the authorization service 300 and has accessed. In step S2401, the second authorization service cooperation unit 411 extracts an authorization operation identifier from the access. In step S1403, the authorization token request unit 406 transmits the authorization operation identifier extracted in step S2401 to the authorization service 300, and receives the authorization token as a response.

In step S2402, the second authorization token management unit 412 stores the authorization token acquired in step S1403. Upon completion of storage of the authorization token, the flow ends.

Figure 11A:
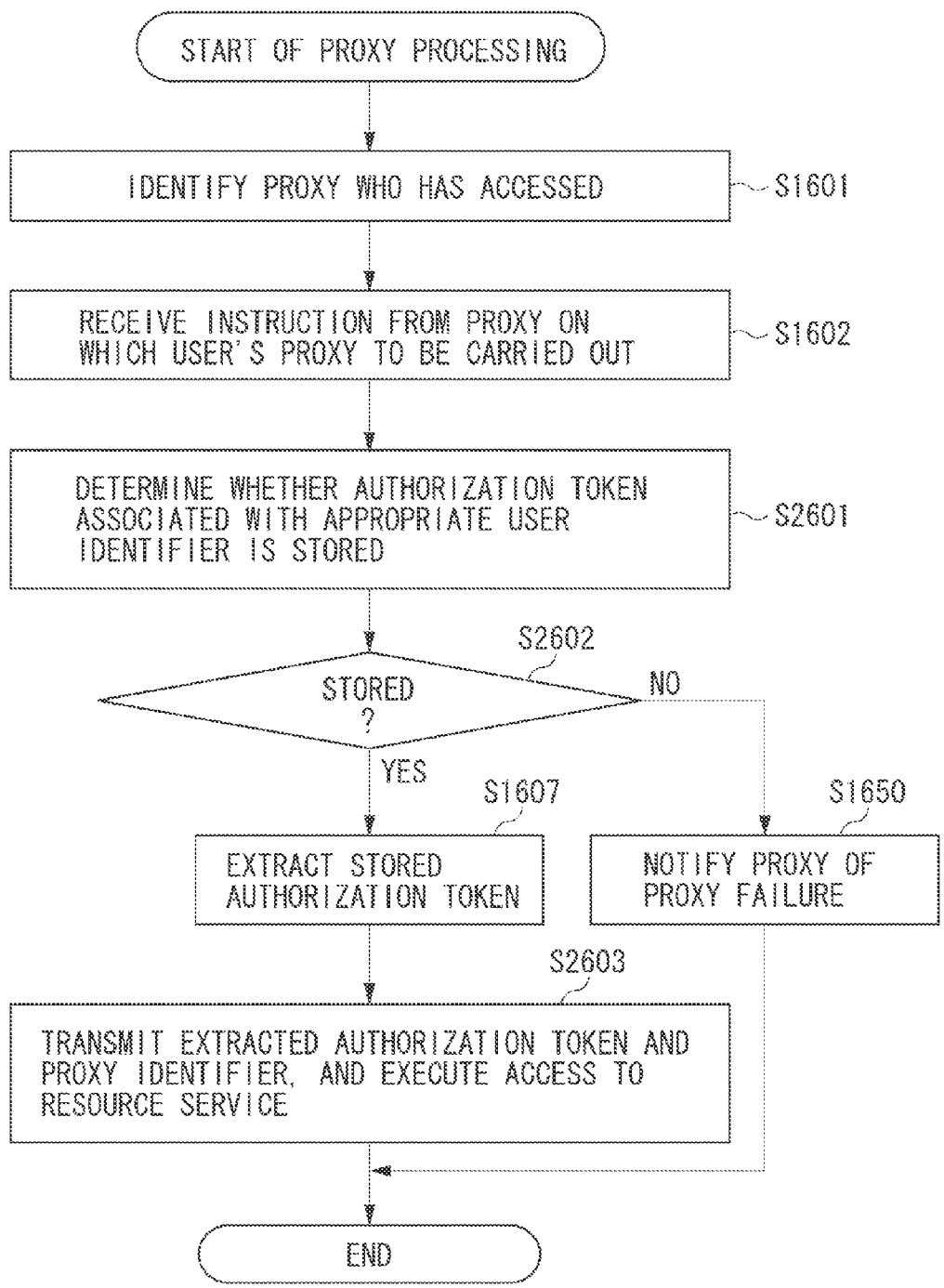
FIGS. 11A, 11B, and 11C are flowcharts illustrating processing request flows using the authorization token according to the second exemplary embodiment.
Figure 11B:
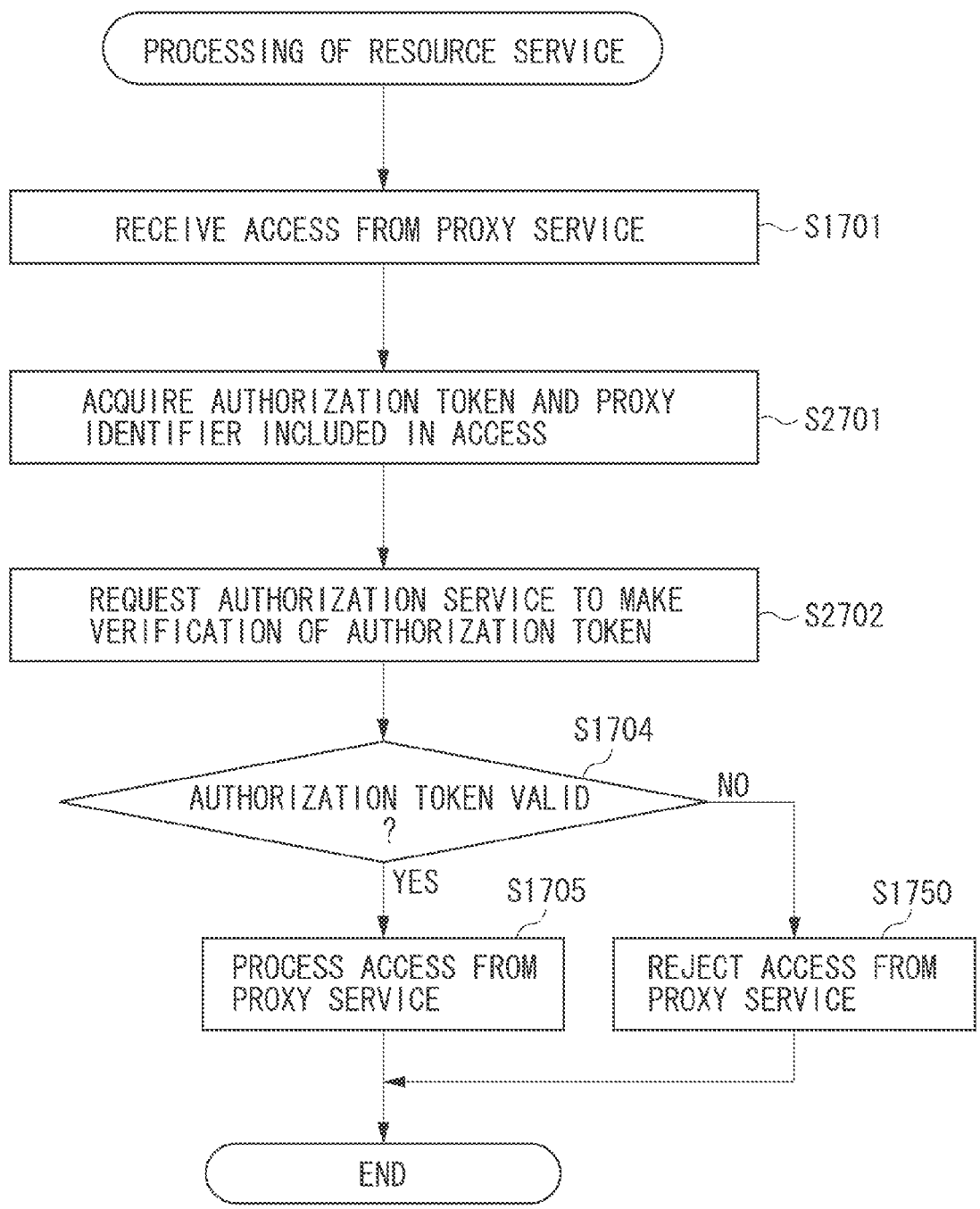
Figure 11C:
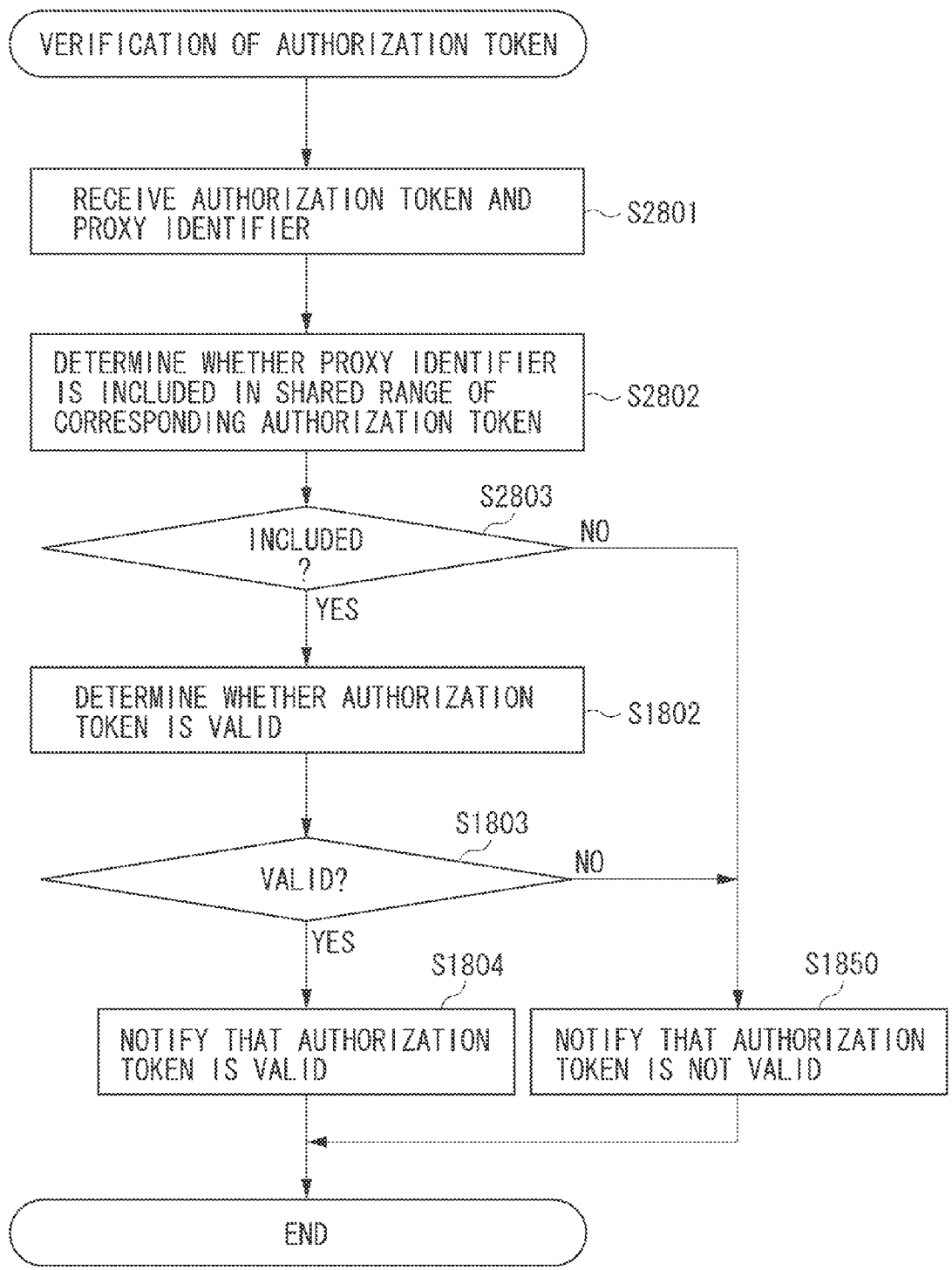

FIGS. 11A, 11B, and 11C are flows in which the proxy service 400 calls the resource service 350 using the issued authorization token and causes the resource service 350 to execute the processing according to the second exemplary embodiment.

First, the proxy accesses the proxy service 400, and instructs the proxy service 400 to call the resource service 350 using the authorization token. Since the call is performed using the authorization token, the call to the resource service 350 is processed as an instruction from the user associated with the authorization token.

When the proxy service 400 instructs the resource service 350 to perform processing using the authorization token, the resource service 350 requests the authorization service 300 to verify the received authorization token. If the authorization token is valid, the resource service 350 executes the processing.

FIG. 11A is a flow in which the proxy service calls the resource service according to the second exemplary embodiment.

In step S2601, the second authorization token management unit 412 checks whether the authorization token associated with the user identifier of the user which the proxy has designated in step S1602 is stored. In step S2602, the second authorization token management unit 412 determines whether the authorization token is stored.

If the authorization token is stored (YES in step S2602), the processing proceeds to step S1607. On the other hand, if the authorization token is not stored (NO in step S2602), the processing proceeds to step S1650. In step S2603, the second resource service cooperation unit 413 performs access to the resource service 350 using the authorization token extracted in step S1607. Further, the data to be sent at the time of the access includes the proxy identifier of the proxy identified in step S1601. Upon completion of the access, the flow ends.

FIG. 11B is a flow of processing performed in the resource service 350 according to the second exemplary embodiment. In step S2701, the second authorization token verification request unit 352 extracts an authorization token and a proxy identifier from the access in step S1701. In step S2702, the second authorization token verification request unit 352 requests the authorization service 300 to verify validity of the authorization token extracted in step S2701, and receives a verification result.

FIG. 11C is a flow of verification of validity of the authorization token in the authorization service 300 according to the second exemplary embodiment.

In step S2801, the second shared range verification unit 311 receives an authorization token from the resource service 350. Also, the second shared range verification unit 311 receives a proxy identifier.

In step S2802, the second shared range verification unit 311 determines whether the proxy indicated by the proxy identifier received in step S2081 is included in the shared range corresponding to the authorization token received in step S2801. If the proxy is included in the shared range (YES in step S2803), the processing proceeds to step S1802. If the proxy is not included in the shared range (NO in step S2803), the processing proceeds to step S1850.

FIGS. 12A and 12B are examples of data managed by the authorization service 300 and the proxy service 400, according to the second exemplary embodiment.

FIG. 12A is an example of data relating to the shared range of the authorization token managed by the authorization service 300, according to the second exemplary embodiment. FIG. 12A indicates that the proxy X and the proxy Y can share the authorization token of the user K. Also, FIG. 12A indicates that the shared range of the authorization token is set to the external service B.

In this case, the proxy X and the proxy Y can instruct the resource service 350 to perform processing from the external service B, on behalf of the user K, using the authorization token 987654321. However, the proxy Z cannot instruct the resource service 350 to perform processing from the external service B, on behalf of the user K, since the proxy Z is not included in the authorization token shared range.

FIG. 12B is an example of data of the authorization tokens managed by the proxy service 400, according to the second exemplary embodiment. The example indicates a situation where the authorization operation of the user K is identified by the authorization operation identifier 111110-122334, and is stored in association with the authorization operation identifier and the authorization token 987654321.

According to the second exemplary embodiment, verification of the shared range of the authorization token is performed by the authorization service 300 that has issued the authorization token, more strict shared range verification can be realized. Since the shared range of the authority transfer is managed by the authorization service 300, it is effective in a case where a plurality of proxy services exists.

In other words, in the first exemplary embodiment, a configuration is introduced for setting a shared range for each of the proxy services, and operating the proxy services. On the other hand, in the second exemplary embodiment, since the most of the configuration has been integrated into the authorization service 300, implementation load of the proxy services is reduced. Therefore, the more the proxy services are, the more effective the second exemplary embodiment becomes.

Next, a third exemplary embodiment will be described below with reference to the drawings. In the first exemplary embodiment and the second exemplary embodiment, the user who uses the service can only directly permit or reject the shared range of the authorization tokens which the proxy has preset. The third exemplary embodiment allows the proxies within a range desired by the user who uses the service to share the authorization token.

Regarding common parts with the first exemplary embodiment, redundant descriptions thereof will be avoided, and therefore only different parts will be described below. In the third exemplary embodiment, the proxy service 400 displays the second shared range confirmation screen 3000. However, it may be configured such that the authorization service 300 may cause the second shared range confirmation screen 3000. The third exemplary embodiment can be applied to any embodiment of the first exemplary embodiment and the second exemplary embodiment.

Figure 13C:
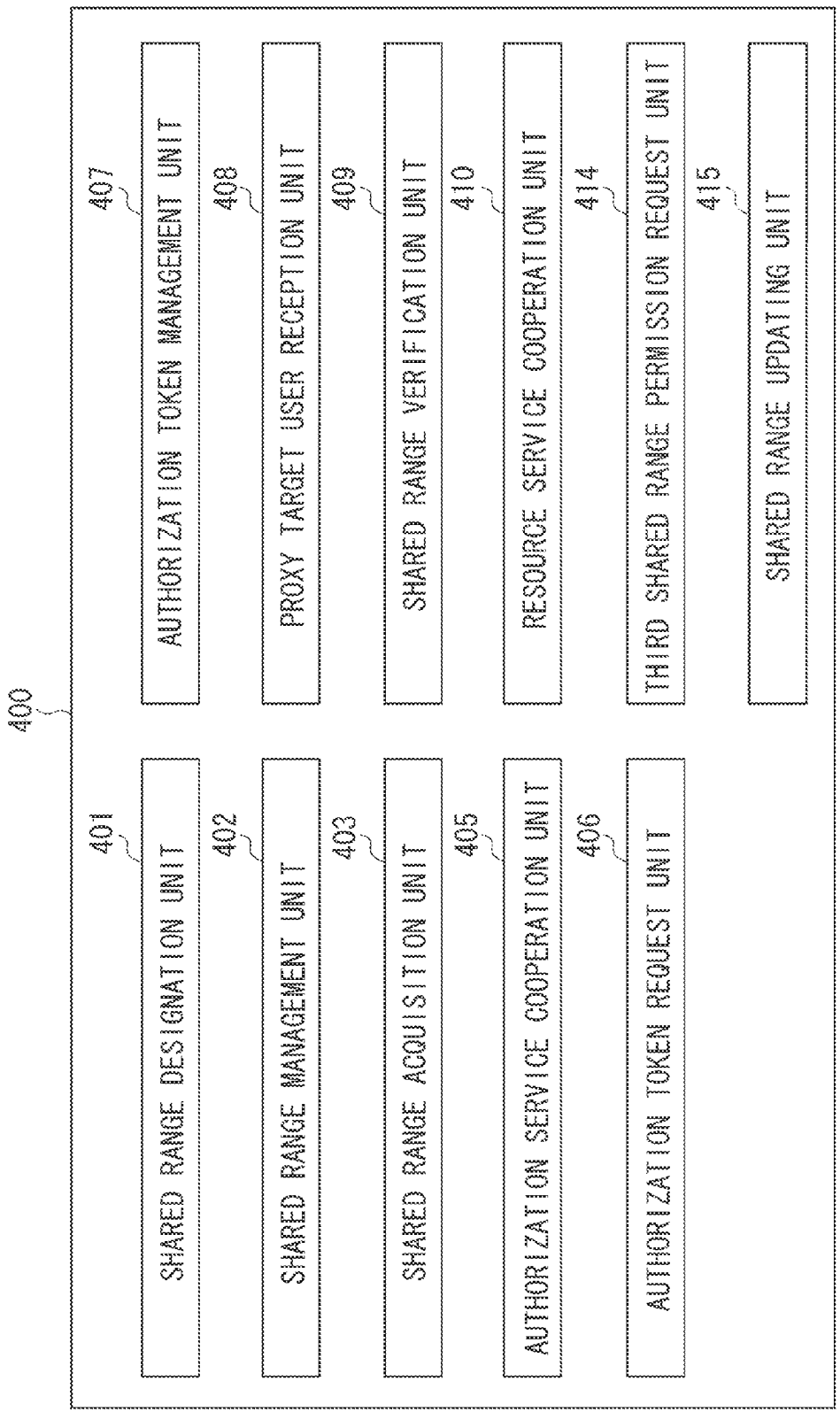

FIGS. 13A, 13B, and 13C are diagrams illustrating module configurations of the authorization service 300, the resource service 350, and the proxy service 400, according to the present exemplary embodiment. FIG. 13A is a diagram illustrating a module configuration of the authorization service 300, according to the present exemplary embodiment.

The authorization service 300 includes the proxy service cooperation unit 301, the authorization request unit 302, the authorization management unit 303, the authorization token verification unit 304, and the verification result notification unit 305. The authorization request unit 302 presents the authorization screen 1001 to the user and requests the user for authorization. The proxy service cooperation unit 301 returns the authorization token stored in the authorization management unit 303 according to the authorization operation identifier received from the proxy service 400. The authorization token verification unit 304 verifies the authorization token received from the resource service 350, and the verification result notification unit 305 returns a verification result to the resource service 350.

FIG. 13B is a diagram illustrating a module configuration of the resource service 350, according to the present exemplary embodiment. The resource service 350 includes an authorization token verification request unit 351. The authorization token verification request unit 351 requests the authorization service 300 to verify whether the authorization token received from the proxy service 400 is valid.

FIG. 13C is a diagram illustrating a module configuration of the proxy service 400, according to the present exemplary embodiment. The proxy service 400 includes the shared range designation unit 401, the shared range management unit 402, and the shared range acquisition unit 403. Further, the proxy service 400 includes the authorization service cooperation unit 405, the authorization token request unit 406, the authorization token management unit 407, the proxy target user reception unit 408, the shared range verification unit 409, and the resource service cooperation unit 410. Furthermore, the proxy service 400 includes a third shared range permission request unit 414, and a shared range updating unit 415.

The shared range designation unit 401 receives an instruction of the shared range from the proxy, and the shared range management unit 402 stores the shared range. When accessed by the user, the shared range acquisition unit 403 extracts the shared range stored by the shared range management unit 402, and the shared range permission request unit 404 presents the shared range confirmation screen 3000 to the user and request the user for permission of the shared range.

The authorization service cooperation unit 405 redirects the access of the user to the authorization service 300, and receives an authorization operation identifier as a response. The authorization token request unit 406 asks the authorization service 300 for issuance of the authorization token using the authorization operation identifier which the authorization service cooperation unit 405 has received. The issued authorization token is stored by the authorization token management unit 407.

The proxy target user reception unit 408 receives access of the proxy. The shared range verification unit 409 verifies whether the proxy who has accessed is included in the shared range of the authorization token stored by the shared range management unit 402. The resource service cooperation unit 410 requests the resource service 350 for processing using the authorization token extracted from the authorization token management unit 407.

Figure 14:
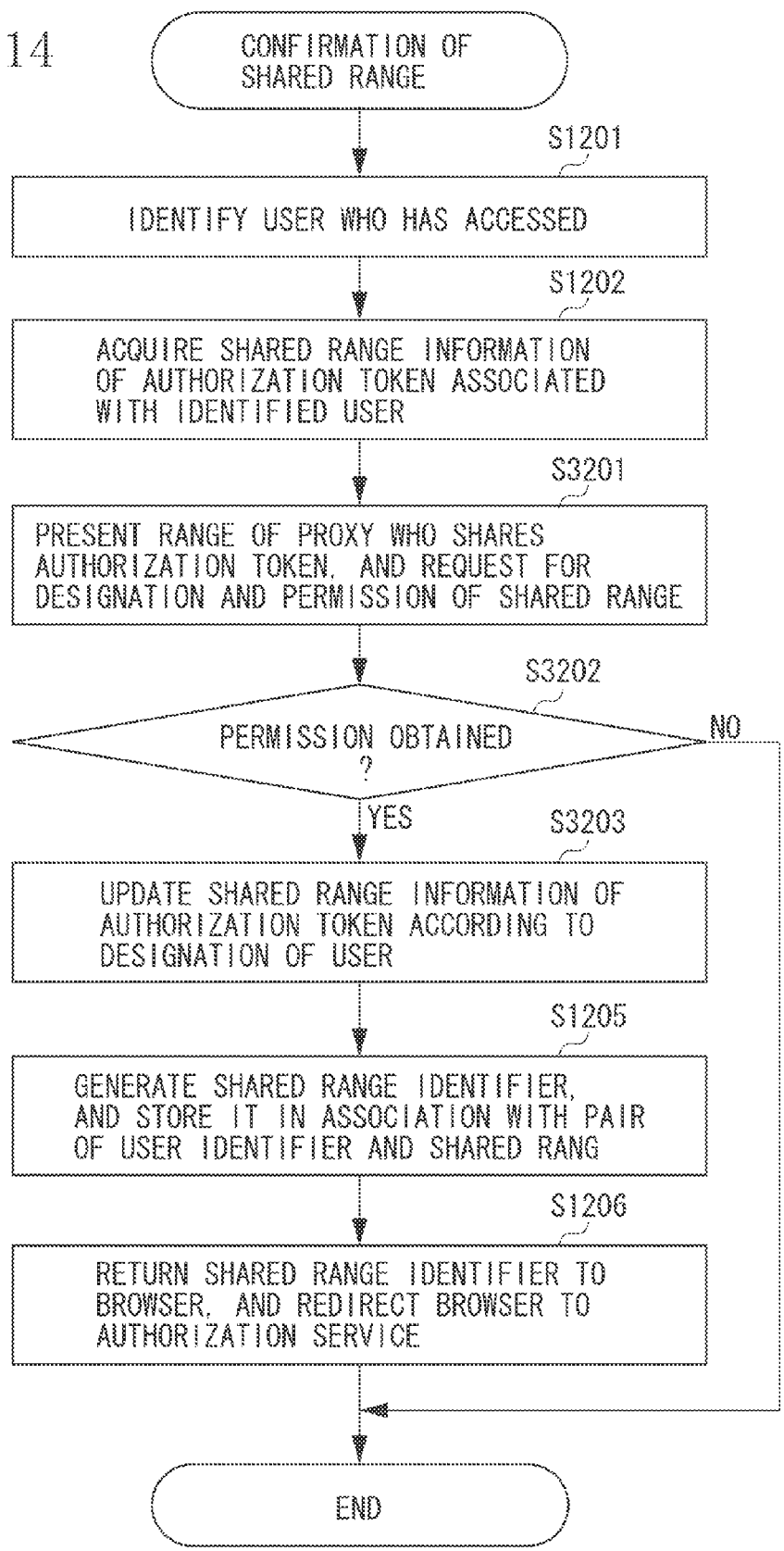
FIG. 14 is a flowchart illustrating authorization and update flow of the shared range according to the third exemplary embodiment.

FIG. 14 is a confirmation and permission flow of the authorization token shared range by the user in the proxy service 400, according to the third exemplary embodiment. When the proxy has finished the shared range preparation, the user performs confirmation and permission of the shared range. The fact that the proxy has finished the shared range preparation may be notified to the user via telephone or electronic mail, or may be notified via other units.

The flow given below is a flow in which the proxy service 400 requests the user for permission of the shared range of the authorization tokens. The flow is started by the user accessing the proxy service 400 by using a web browser. The authorization token issued in subsequent flows will receive permission by the user, and is shared among the proxies within a range permitted at this process and becomes usable.

In step S3201, the third shared range permission request unit 414 presents a setting screen to the user, based on the shared range information of the authorization token acquired in step S1202, and requests the user for instruction and permission of the shared range.

Figure 15:
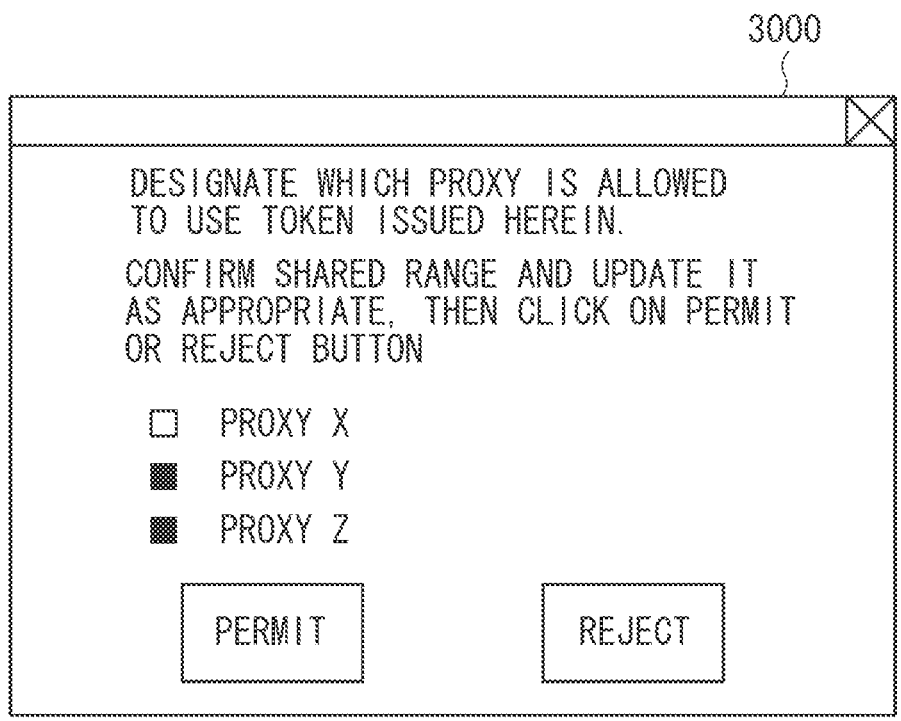
FIG. 15 illustrates an authorization screen example according to the third exemplary embodiment.

A second shared range confirmation screen 3000 illustrated in FIG. 15 is a screen when requesting the user for permitting the proxy X, the proxy Y, and the proxy Z to share the authorization token, and is a setting screen that allows setting of the shared range. Further, FIG. 15 illustrates a case where the user designates the proxy Y and the proxy Z among the presented proxies and permits them to share the authorization token.

In step S3202, the third shared range permission request unit 414 determines whether the user has permitted the shared range in step S3201. As a result of the determination, if the user has permitted the shared range (YES in step S3202), the processing proceeds to step S3203. If the user has not permitted the shared range (NO in step S3202), the flow ends. In step S3203, the shared range updating unit 415 updates the shared range of the authorization token managed by the authorization token management unit 407 according to designation of the user in step S3201.

The third exemplary embodiment is an exemplary embodiment that provides a setting screen for setting whether to permit the users in the shared range to share the authorization token, as a setting screen which allows the setting whether to permit which users in the shared range to share the authorization token. Then, according to the third exemplary embodiment, it can also deal with such requests as the ones for permitting only proxy whom the user desires to share the authorization token, among the proxies within the shared range of the authorization token which the proxy has designated.

Accordingly, even if it is assumed that a plurality of proxies acts on behalf of the user to perform service, in a case where some proxies are not authorized by the user who is a customer, the unauthorized customers cannot act on behalf of the user to perform the service. Therefore, the third exemplary embodiment can perform more flexible authority transfer than the first exemplary embodiment, and the second exemplary embodiment.

Hereinabove, in the respective exemplary embodiments, there has been described, in a system in which a plurality of proxies performs works on behalf of the user, the plurality of proxies to share the authorization token, without performing authorization operation for each proxy by the user. However, the configurations which have been described in the respective exemplary embodiments may be implemented by other embodiments.

Other Embodiments

Aspects of the present invention can also be realized by a computer of a system or apparatus (or devices such as a CPU or micro-processing unit (MPU)) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as within the scope of the present invention. In an example, a computer-readable storage medium may store a program that causes an authority delegate system to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-006204 filed Jan. 16, 2012, which is hereby incorporated by reference herein in its entirety.

What is claimed is:

1. An authority delegate system including a first server system configured to manage specific information, a second server system configured to provide a service using acquired specific information, an authentication device, and a client operated by a first user who is allowed to use the service, the authority delegate system comprising:
 a processor coupled to a memory;
 a reception unit configured to receive a shared range of an authorization token used by the second server system, wherein the authorization token is for authorizing a plurality of users other than the first user to use the specific information managed by the first server system;
 a transmission unit configured to transmit, to the client, a setting screen for the first user to set whether to permit the plurality of users within the shared range to share the authorization token, based on the received shared range;
 a management unit configured to issue one authorization token in response to receiving a permission instruction via the setting screen, and manage the shared range of the authorization token set by the first user via the transmitted setting screen, and the issued one authorization token, in association with each other,
 wherein the setting screen is a setting screen that allows setting whether to permit which users within the shared range to share the authorization token, and wherein the shared range of the authorization token is managed by the management unit by setting users who are permitted to share the authorization token by the first user via the setting screen;
 a determination unit configured to determine, in response to use of the service being requested by a client of a second user who has received the authorization token, whether the second user is included in the plurality of users within the shared range of the transmitted authorization token used by the second server system; and
 a provision unit configured to provide, in response to the determination unit determining that the second user is included in the plurality of users within the shared range of the authorization token and confirmation that the authorization token is valid, the service to the second user using the specific information acquired by the second server system from the first server system such that the second user is able to provide a proxy service to the first user,
 wherein the reception unit, the transmission unit, the management unit, the determination unit, and the provision unit are implemented by the processor.

2. The authority delegate system according to claim 1, wherein the shared range of the authorization token received by the reception unit is a setting received from a client personal computer operated by the second user, and is a setting managed by the management unit by having been received, and
 wherein the management unit further includes an updating unit configured
 to perform control, in response to the shared range of the authorization token set by the first user via the setting screen that allows setting whether to permit which users of the plurality of users within the shared range to share the authorization token being different from a shared range of an authorization token received from a client operated by the second user,
 to update the shared range to the shared range of the authorization token set by the first user via the setting screen, and
 to perform control, in response to a shared range of an authorization token set by the first user via a setting screen that allows setting whether to permit which customers within the shared range to share the authorization token being same as a shared range of an authorization token received from a client operated by the second user, not to update the shared range of the authorization token received from the client operated by the second user.

3. The authority delegate system according to claim 1, wherein the authentication device acquires, via the client from the second server system, a shared range identifier for identifying the shared range of the authorization token set by the first user via the transmitted setting screen, and transmits the shared range identifier and an authorization operation identifier to the second server system via the client in response to permission for an issuance of an authorization token via an authorization screen, and
 wherein the management unit provided in the second server system has an authorization token issued from the authentication device based on the authorization operation identifier, and manages the issued authorization token in association with the shared range of the authorization token based on the shared range identifier.

4. A second server system including a first server system configured to manage specific information, an authentication device, and a third server system capable of communicating with a client operated by a first user who is allowed to use the service, the second server system comprising:
- a processor coupled to a memory;
- a reception unit configured to receive a shared range of an authorization token used by the second server system, wherein the authorization token is for authorizing a plurality of users other than the first user to use the specific information managed by the first server system;
- a transmission unit configured to transmit, to the client, a setting screen for the first user to set whether to permit the plurality of users within the shared range to share the authorization token, based on the received shared range;
- a management unit configured to issue one authorization token in response to receiving a permission instruction via the setting screen, and manage the shared range of the authorization token set by the first user via the transmitted setting screen, and the issued one authorization token, in association with each other,
- wherein the setting screen is a setting screen that allows setting whether to permit which users within the shared range to share the authorization token, and wherein the shared range of the authorization token is managed by the management unit by setting users who are permitted to share the authorization token by the first user via the setting screen;
- a determination unit configured to determine, in response to use of the service being requested by a client of a second user who has received the authorization token, whether the second user is included in the plurality of users within the shared range of the transmitted authorization token used by the second server system; and
- a provision unit configured to provide, in response to the determination unit determining that the second user is included in the plurality of users within the shared range of the authorization token and confirmation that the authorization token is valid, the service to the second user using the specific information acquired by the second server system from the first server system such that the second user is able to provide a proxy service to the first user,
- wherein the reception unit, the transmission unit, the management unit, the determination unit, and the provision unit are implemented by the processor.

5. The second server system according to claim 4,
wherein the shared range of the authorization token received by the reception unit is a setting received from a client personal computer operated by the second user, and is a setting managed by the management unit by having been received, and
wherein the management unit further includes an updating unit configured
- to perform control, in response to the shared range of the authorization token set by the first user via the setting screen that allows setting whether to permit which users of the plurality of users within the shared range to share the authorization token being different from a shared range of an authorization token received from a client operated by the second user,
- to update the shared range to the shared range of the authorization token set by the first user via the setting screen, and
- to perform control, in response to a shared range of an authorization token set by the first user via a setting screen that allows setting whether to permit which customers within the shared range to share the authorization token being same as a shared range of an authorization token received from a client operated by the second user, not to update the shared range of the authorization token received from the client operated by the second user.

6. The second server system according to claim 4,
wherein the authentication device acquires, via the client from the second server system, a shared range identifier for identifying the shared range of the authorization token set by the first user via the transmitted setting screen, and transmits the shared range identifier and an authorization operation identifier to the second server system via the client in response to permission for an issuance of an authorization token via an authorization screen, and
wherein the management unit provided in the second server system has an authorization token issued from the authentication device based on the authorization operation identifier, and manages the issued authorization token in association with the shared range of the authorization token based on the shared range identifier.

7. A control method for controlling an authority delegate system including a first server system configured to manage specific information, a second server system configured to provide a service using acquired specific information, an authentication device, and a client operated by a first user who is allowed to use the service, the control method comprising:
- receiving a shared range of an authorization token used by the second server system, wherein the authorization token is for authorizing a plurality of users other than the first user to use the specific information managed by the first server system;
- transmitting, to the client, a setting screen for the first user to set whether to permit the plurality of users within the shared range to share the authorization token, based on the received shared range;
- issuing one authorization token in response to receiving a permission instruction via the setting screen, and managing the shared range of the authorization token set by the first user via the transmitted setting screen, and the issued one authorization token, in association with each other,
- wherein the setting screen is a setting screen that allows setting whether to permit which users within the shared range to share the authorization token, and wherein the shared range of the authorization token is managed by setting users who are permitted to share the authorization token by the first user via the setting screen;
- determining, in response to use of the service being requested by a client of a second user who has received the authorization token, whether the second user is included in the plurality of users within the shared range of the transmitted authorization token used by the second server system; and
- providing, in response to determining that the second user is included in the plurality of users within the shared range of the authorization token and confirmation that the authorization token is valid, the service to the second user using the specific information acquired by the second server system from the first server system such that the second user is able to provide a proxy service to the first user.

8. The control method according to claim 7,
wherein the received shared range of the authorization token is a setting received from a client personal computer operated by the second user, and is a setting managed by having been received, and
wherein issuing further includes updating, wherein updating includes
performing control, in response to the shared range of the authorization token set by the first user via the setting screen that allows setting whether to permit which users of the plurality of users within the shared range to share the authorization token being different from a shared range of an authorization token received from a client operated by the second user, updating the shared range to the shared range of the authorization token set by the first user via the setting screen, and performing control, in response to a shared range of an authorization token set by the first user via a setting screen that allows setting whether to permit which customers within the shared range to share the authorization token being same as a shared range of an authorization token received from a client operated by the second user, not to update the shared range of the authorization token received from the client operated by the second user.

9. The control method according to claim 7,
wherein the authentication device acquires, via the client from the second server system, a shared range identifier for identifying the shared range of the authorization token set by the first user via the transmitted setting screen, and transmits the shared range identifier and an authorization operation identifier to the second server system via the client in response to permission for an issuance of an authorization token via an authorization screen, and
wherein the second server system has an authorization token issued from the authentication device based on the authorization operation identifier, and manages the issued authorization token in association with the shared range of the authorization token based on the shared range identifier.

10. A non-transitory computer-readable storage medium storing a program, which when executed, causes an authority delegate system to perform a control method, wherein the authority delegate system includes a first server system configured to manage specific information, a second server system configured to provide a service using acquired specific information, an authentication device, and a client operated by a first user who is allowed to use the service, the control method comprising:
receiving a shared range of an authorization token used by the second server system, wherein the authorization token is for authorizing a plurality of users other than the first user to use the specific information managed by the first server system;
transmitting, to the client, a setting screen for the first user to set whether to permit the plurality of users within the shared range to share the authorization token, based on the received shared range;
issuing one authorization token in response to receiving a permission instruction via the setting screen, and managing the shared range of the authorization token set by the first user via the transmitted setting screen, and the issued one authorization token, in association with each other,
wherein the setting screen is a setting screen that allows setting whether to permit which users within the shared range to share the authorization token, and wherein the shared range of the authorization token is managed by setting users who are permitted to share the authorization token by the first user via the setting screen;
determining, in response to use of the service being requested by a client of a second user who has received the authorization token, whether the second user is included in the plurality of users within the shared range of the transmitted authorization token used by the second server system; and
providing, in response to determining that the second user is included in the plurality of users within the shared range of the authorization token and confirmation that the authorization token is valid, the service to the second user using the specific information acquired by the second server system from the first server system such that the second user is able to provide a proxy service to the first user.

11. The non-transitory computer-readable storage medium according to claim 10,
wherein the received shared range of the authorization token is a setting received from a client personal computer operated by the second user, and is a setting managed by having been received, and
wherein issuing further includes updating, wherein updating includes
performing control, in response to the shared range of the authorization token set by the first user via the setting screen that allows setting whether to permit which users of the plurality of users within the shared range to share the authorization token being different from a shared range of an authorization token received from a client operated by the second user,
updating the shared range to the shared range of the authorization token set by the first user via the setting screen, and
performing control, in response to a shared range of an authorization token set by the first user via a setting screen that allows setting whether to permit which customers within the shared range to share the authorization token being same as a shared range of an authorization token received from a client operated by the second user, not to update the shared range of the authorization token received from the client operated by the second user.

12. The non-transitory computer-readable storage medium according to claim 10,
wherein the authentication device acquires, via the client from the second server system, a shared range identifier for identifying the shared range of the authorization token set by the first user via the transmitted setting screen, and transmits the shared range identifier and an authorization operation identifier to the second server system via the client in response to permission for an issuance of an authorization token via an authorization screen, and
wherein the second server system has an authorization token issued from the authentication device based on the authorization operation identifier, and manages the issued authorization token in association with the shared range of the authorization token based on the shared range identifier.

* * * * *